(12) United States Patent
Ashpole

(10) Patent No.: US 8,899,536 B2
(45) Date of Patent: Dec. 2, 2014

(54) JOINT AND FOLDABLE STRUCTURES EMPLOYING THE SAME

(71) Applicant: Benjamin Ashpole, North Webster, IN (US)

(72) Inventor: Benjamin Ashpole, North Webster, IN (US)

(*) Notice: Subject to any disclaimer, the term of this patent is extended or adjusted under 35 U.S.C. 154(b) by 0 days.

(21) Appl. No.: 14/028,202

(22) Filed: Sep. 16, 2013

(65) Prior Publication Data

US 2014/0034792 A1    Feb. 6, 2014

Related U.S. Application Data

(62) Division of application No. 12/889,169, filed on Sep. 23, 2010, now abandoned.

(60) Provisional application No. 61/245,757, filed on Sep. 25, 2009.

(51) Int. Cl.
*F16M 11/38* (2006.01)
*A47B 91/00* (2006.01)
(Continued)

(52) U.S. Cl.
CPC ............. *A47J 37/067* (2013.01); *A47C 4/20* (2013.01); *E04G 5/08* (2013.01); *F16M 11/38*
(Continued)

(58) Field of Classification Search
CPC .............. A47J 37/0763; A47J 2037/0777; A47J 37/067; A47J 33/00
USPC .............. 248/150, 166, 346.3; 403/100–102; 126/9 R, 9 B; 211/85, 195, 202
See application file for complete search history.

(56) References Cited

U.S. PATENT DOCUMENTS

| 21,124 A | 8/1858 | Eliot |
|---|---|---|
| 41,664 A | 2/1864 | Hoadley |

(Continued)

FOREIGN PATENT DOCUMENTS

| EP | 0248540 A1 | 12/1987 | |
|---|---|---|---|
| EP | 1389439 A1 * | 2/2004 | ............. A47J 37/07 |

(Continued)

OTHER PUBLICATIONS

Office Action issued Oct. 24, 2012 in U.S. Appl. No. 12/889,169 by Ashpole.

(Continued)

*Primary Examiner* — Jonathan Liu
*Assistant Examiner* — Chiedu Chibogu
(74) *Attorney, Agent, or Firm* — Panitch Schwarze Belisario & Nadel LLP

(57) ABSTRACT

A folding joint mechanism for stackably collapsing elongated structural sections includes a plurality of substantially identical brackets pivotably interconnected and rotatable between an extended and a stowed configuration. In the extended configuration, the brackets abut each other against stop protrusions on the top outside surface of each bracket forming foldable extensions that are able to support significant weight by distributing the top. side force. In the stowed configuration, the brackets are compacted to a substantially stacked disposition whereby the brackets are aligned and directly adjacent to one another. The joint and bracket assemblies may be employed in elongated sections of various structures in which compactability may be advantageous for shipping, storage, and user transportation.

15 Claims, 32 Drawing Sheets

(51) Int. Cl.

| | | |
|---|---|---|
| *A47J 37/07* | (2006.01) | |
| *F16C 11/00* | (2006.01) | |
| *A47C 4/20* | (2006.01) | |
| *E04G 5/08* | (2006.01) | |
| *A47C 19/12* | (2006.01) | |
| *E04G 1/34* | (2006.01) | |
| *A47C 19/02* | (2006.01) | |
| *A47J 37/06* | (2006.01) | |
| *F16M 11/24* | (2006.01) | |
| *F16M 11/22* | (2006.01) | |
| *E04H 15/48* | (2006.01) | |

(52) U.S. Cl.
CPC ....... (2013.01); *A47C 19/12* (2013.01); *F16M 2200/044* (2013.01); *E04G 1/34* (2013.01); *A47C 19/021* (2013.01); *F16M 2200/065* (2013.01); *A47J 37/0694* (2013.01); *A47J 37/07* (2013.01); *F16M 11/24* (2013.01); *F16M 11/22* (2013.01); *A47J 37/0763* (2013.01); *A47J 2037/0777* (2013.01); *E04H 15/48* (2013.01)
USPC .......... 248/166; 248/150; 248/346.3; 211/85; 211/195; 211/202; 126/9 R; 126/9 B; 403/100; 403/101; 403/102

(56) References Cited

U.S. PATENT DOCUMENTS

| | | | |
|---|---|---|---|
| 44,076 A | 9/1864 | Colburn | |
| 139,290 A | 5/1873 | Bradley | |
| 238,896 A | 3/1881 | Harding | |
| 263,351 A | 8/1882 | Phillips | |
| 284,008 A | 8/1883 | Hass | |
| 365,348 A | 6/1887 | Muller | |
| 399,902 A | 3/1889 | Jeffery | |
| 431,459 A | 7/1890 | Griswold | |
| 453,890 A | 6/1891 | Oelein | |
| 479,157 A | 7/1892 | Reed | |
| 491,645 A | 2/1893 | Hart | |
| 580,918 A | 4/1897 | Willcox | |
| 687,802 A | 12/1901 | Webb | |
| 713,255 A | 11/1902 | Traut | |
| 734,013 A | 7/1903 | Traut | |
| 821,356 A | 5/1906 | Gillespie | |
| 821,822 A | 5/1906 | Nootbaar | |
| 840,628 A | 1/1907 | Johnson | |
| 849,638 A | 4/1907 | Platt | |
| 851,724 A | 4/1907 | Wood | |
| 897,737 A | 9/1908 | Goodrich | |
| 909,411 A | 1/1909 | Hockney | |
| 955,314 A | 4/1910 | Borne | |
| 981,598 A | 1/1911 | Sandelin | |
| 982,302 A * | 1/1911 | Roncaglia | 248/166 |
| 1,096,657 A | 5/1914 | Williams | |
| 1,138,498 A * | 5/1915 | Moore | 248/167 |
| 1,142,418 A | 6/1915 | Hamalainen | |
| 1,239,136 A | 9/1917 | Stone | |
| 1,309,049 A * | 7/1919 | Syrett | 248/439 |
| 1,337,817 A | 4/1920 | Bode | |
| 1,440,713 A | 1/1923 | Ausbourne | |
| 1,441,350 A | 1/1923 | Hermann | |
| 1,501,713 A | 7/1924 | McCaffrey | |
| 1,548,392 A | 8/1925 | Stites | |
| 1,554,034 A | 9/1925 | Richie | |
| 1,593,930 A | 7/1926 | Carrier | |
| 1,616,870 A | 2/1927 | Rotthouse | |
| 1,762,589 A | 6/1930 | Menk | |
| 1,822,470 A | 9/1931 | Abbot | |
| 1,886,198 A | 11/1932 | Krueger | |
| 1,970,196 A | 8/1934 | Rodemeyer | |
| 1,979,567 A | 11/1934 | Nicholson | |
| 2,024,039 A | 12/1935 | Harting | |
| 2,077,541 A | 4/1937 | Wieslander | |
| 2,079,942 A | 5/1937 | LeVelle | |
| 2,181,025 A | 11/1939 | Plotkin | |
| 2,275,353 A | 3/1942 | Engert | |
| 2,293,394 A | 8/1942 | Johannsen | |
| 2,302,661 A | 11/1942 | Benson | |
| 2,474,318 A * | 6/1949 | Molla | 108/158 |
| 2,478,198 A | 8/1949 | Kroener | |
| 2,560,466 A | 7/1951 | Meinke | |
| 2,641,018 A | 6/1953 | Snyder | |
| 2,642,018 A | 6/1953 | Weebar | |
| 2,680,534 A | 6/1954 | Penfold | |
| 2,803,850 A | 8/1957 | Hooper | |
| 2,839,779 A | 6/1958 | Haag | |
| 2,845,652 A | 8/1958 | Voester | |
| 2,852,802 A | 9/1958 | Seby | |
| 2,877,840 A | 3/1959 | Hurowitz | |
| 2,930,075 A | 3/1960 | Deutchman | |
| 2,987,069 A | 6/1961 | Presnick | |
| 3,041,001 A | 6/1962 | Feifert | |
| 3,068,946 A | 12/1962 | Frisby | |
| 3,071,785 A | 1/1963 | Holt | |
| 3,168,791 A | 2/1965 | Nutting | |
| 3,177,000 A | 4/1965 | Alexander | |
| 3,178,762 A | 4/1965 | Whiting | |
| 3,203,731 A | 8/1965 | Krueger | |
| 3,232,136 A | 2/1966 | Bahmuller | |
| 3,285,654 A | 11/1966 | Cramer | |
| 3,295,699 A | 1/1967 | Bauernschub, Jr. | |
| 3,359,594 A | 12/1967 | Pastoor | |
| 3,423,787 A | 1/1969 | Horstman | |
| 3,464,373 A | 9/1969 | Larson | |
| 3,484,895 A | 12/1969 | Mock | |
| 3,496,687 A | 2/1970 | Greenberg | |
| 3,503,130 A | 3/1970 | Ferguson | |
| 3,538,539 A | 11/1970 | Allison | |
| 3,602,942 A | 9/1971 | Neff, Sr. et al. | |
| 3,646,895 A | 3/1972 | Campbell | |
| 3,648,328 A | 3/1972 | McCabe | |
| 3,718,943 A | 3/1973 | Bustin | |
| 3,837,328 A * | 9/1974 | Schaffer | 126/29 |
| 3,938,772 A | 2/1976 | Andrusiak | |
| 3,952,369 A | 4/1976 | Erickson | |
| 3,967,803 A * | 7/1976 | Kienlen et al. | 248/152 |
| 3,975,999 A * | 8/1976 | Carroll | 99/449 |
| 3,999,246 A | 12/1976 | Suska | |
| 4,123,822 A | 11/1978 | Bentley | |
| 4,193,165 A | 3/1980 | Malacheski et al. | |
| 4,276,726 A | 7/1981 | Derus | |
| 4,283,811 A | 8/1981 | George | |
| 4,286,353 A | 9/1981 | Roche | |
| 4,302,866 A | 12/1981 | Irvin | |
| 4,315,345 A | 2/1982 | Schijf | |
| 4,333,206 A | 6/1982 | Lang et al. | |
| 4,383,488 A | 5/1983 | Macho et al. | |
| 4,386,645 A | 6/1983 | Dever et al. | |
| 4,426,790 A | 1/1984 | Kimel | |
| 4,434,525 A | 3/1984 | Labelle | |
| 4,437,275 A | 3/1984 | Zeigler | |
| 4,444,240 A | 4/1984 | Bannister | |
| 4,478,234 A | 10/1984 | Bester | |
| 4,489,910 A | 12/1984 | Ferguson | |
| 4,534,079 A | 8/1985 | Tucker | |
| 4,594,829 A | 6/1986 | Herrgord | |
| 4,596,101 A | 6/1986 | Brinker | |
| 4,604,845 A | 8/1986 | Brinker | |
| 4,655,122 A | 4/1987 | McCabe | |
| 4,660,613 A | 4/1987 | Dagenais | |
| 4,787,121 A | 11/1988 | Racenis et al. | |
| 4,816,310 A | 3/1989 | Truyens | |
| 4,819,957 A | 4/1989 | Printy | |
| 4,852,213 A | 8/1989 | Shewchuk | |
| 4,858,488 A | 8/1989 | Butts | |
| 4,913,463 A | 4/1990 | Tlapek et al. | |
| 4,977,824 A * | 12/1990 | Shinler | 99/449 |
| 5,024,031 A | 6/1991 | Hoberman | |
| 5,065,734 A * | 11/1991 | Elliott | 126/9 R |
| 5,071,014 A * | 12/1991 | Robinson | 211/204 |
| 5,184,794 A | 2/1993 | Saito | |
| 5,220,951 A | 6/1993 | Dagenais | |
| 5,263,507 A | 11/1993 | Chuang | |

(56) References Cited

U.S. PATENT DOCUMENTS

| | | | |
|---|---|---|---|
| 5,317,961 A * | 6/1994 | Shinler | ............................ 99/449 |
| 5,335,604 A | 8/1994 | Jiang | |
| 5,339,969 A | 8/1994 | Filipowski | |
| 5,580,316 A | 12/1996 | Hill et al. | |
| 5,669,106 A | 9/1997 | Daoud | |
| 5,742,980 A | 4/1998 | Nitta | |
| 5,842,508 A | 12/1998 | Krupke et al. | |
| 5,915,440 A | 6/1999 | Repo | |
| 5,915,446 A | 6/1999 | De Zen | |
| 6,000,175 A | 12/1999 | Gale et al. | |
| 6,015,190 A | 1/2000 | Wend | |
| 6,145,165 A | 11/2000 | Torcato | |
| 6,254,177 B1 | 7/2001 | Tseng | |
| 6,353,967 B1 | 3/2002 | Escobar et al. | |
| 6,378,830 B1 | 4/2002 | Lu | |
| 6,439,111 B1 * | 8/2002 | Lu | ................................. 99/449 |
| 6,687,956 B1 | 2/2004 | Foo | |
| 6,766,623 B1 | 7/2004 | Kalnay | |
| 6,938,866 B2 | 9/2005 | Kirchhoff | |
| 6,941,704 B2 | 9/2005 | Chen et al. | |
| 7,111,408 B2 | 9/2006 | Critelli et al. | |
| 7,160,000 B2 | 1/2007 | Eldridge et al. | |
| 7,267,358 B2 | 9/2007 | Chen | |
| 7,357,238 B2 | 4/2008 | Zeigler | |
| 7,374,237 B2 | 5/2008 | Park et al. | |
| 7,604,212 B2 | 10/2009 | Tsai | |
| 7,631,848 B2 | 12/2009 | Enochs | |
| 7,712,261 B2 | 5/2010 | Zeigler | |
| 2002/0020792 A1 | 2/2002 | Lee | |
| 2003/0000096 A1 | 1/2003 | Wang | |
| 2004/0099622 A1 * | 5/2004 | Lee | ................................. 211/85 |
| 2004/0120758 A1 | 6/2004 | Chen et al. | |
| 2004/0172752 A1 | 9/2004 | Vo et al. | |
| 2004/0246725 A1 | 12/2004 | Eldridge et al. | |
| 2005/0194032 A1 | 9/2005 | Zeigler | |
| 2006/0168834 A1 | 8/2006 | Critelli et al. | |
| 2008/0185358 A1 | 8/2008 | Hernandez | |
| 2008/0229681 A1 | 9/2008 | Tsai | |

FOREIGN PATENT DOCUMENTS

| | | |
|---|---|---|
| JP | 2008-291961 A | 12/2008 |
| RU | 2147651 C1 | 4/2000 |
| WO | 8303861 A1 | 11/1983 |
| WO | 0043708 A1 | 7/2000 |
| WO | 0142603 A1 | 6/2001 |
| WO | 2004083579 A1 | 9/2004 |
| WO | 2006106168 A1 | 10/2006 |

OTHER PUBLICATIONS

Office Action issued May 15, 2013 in U.S. Appl. No. 12/889,169 by Ashpole.

* cited by examiner

Fig 1a.) _Prior Art_
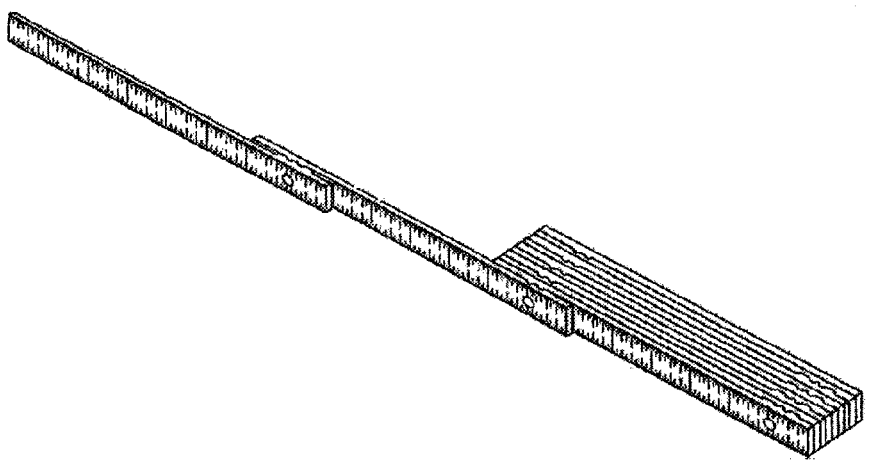
Fig 1b.) _Prior Art_
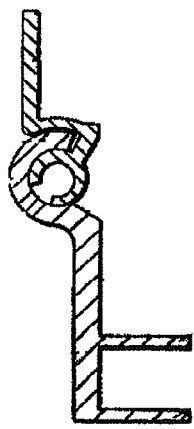
Fig 1c.) _Prior Art_
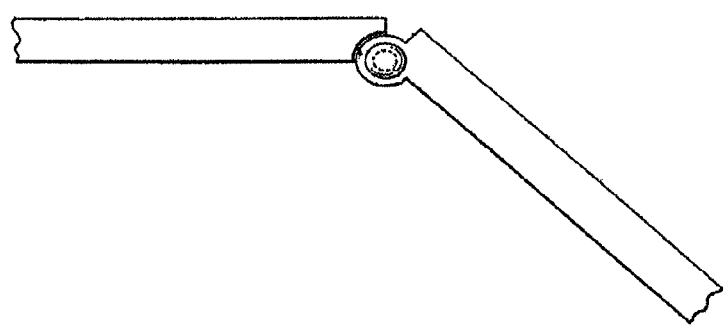

US 8,899,536 B2

JOINT AND FOLDABLE STRUCTURES EMPLOYING THE SAME

CROSS-REFERENCE TO RELATED APPLICATIONS

The present application is a divisional application of U.S. application Ser. No. 12/889,169 filed Sep. 23, 2010, which claims priority under to U.S. Provisional Application No. 61/245,757 filed Sep. 25, 2009, the disclosures of which are incorporated herein by reference.

BACKGROUND OF THE INVENTION

This application relates to joints, specifically joints that allow for segments connected by such joints to support significant weight as well as to compact efficiently to a stowed configuration, facilitating shipping, storage, and user transport of structures constructed of the same.

Methods of compacting various structures have been known for some time and are very useful for disassembling components of large volume structures to be stowed and transported with much lower volume. Yet, all of these have serious drawbacks that reduce compactability, functionality, and convenience. Telescoping mechanisms, for example, are employed to stow and transport elongated objects such as tripods, projector stands, antennas, seat height adjusters, and the like. These telescoping structures, however, often rely on the friction of the segments to be extended and thus cannot, support significant weight on top without expensive reinforcement locks. Moreover, these structures are inherently hollow and thus generally too weak for supporting weight laterally. Various other compacting or disassembly methods are used in structures like shelter frames, fishing rods, scaffolding, ladders, and the like. In the collapsed configuration, however, these are often stored in somewhat unwieldy, cumbersome arrangements that are frequently still too hefty and awkwardly shaped for convenience. Some other structures, such as pull-out beds, strollers, lawn chairs, and the like include strategically placed joints for folding in usually one dimension, but even in the collapsed state, these structures are still fairly large and relatively difficult to store or transport.

Certain furniture sets, such as those sold by IKEA, while specifically designed to be disassembled, are nonetheless packaged in very large containers that are often difficult to carry and transport. Some structures exist, however, that are constructed almost entirely of substantially similar collapsible components to improve compactability. Examples of such structures are those provided in U.S. Pat. No. 5,024,031 to Hoberman, U.S. Pat. No. 4,437,275 to Ziegler, U.S. Pat. No. 4,276,726 to Derus, and U.S. Pat. No. 3,496,687 to Greenberg et al. While these structures do significantly collapse, the structural components are not directly adjacent to each other in the collapsed state, creating inefficient recesses that waste space and reduce compactability. Other foldable structures collapse in an efficient manner without any wasteful recesses. For example, folding rulers, such as those provided in U.S. Pat. No. 849,638 to Platt, U.S. Pat. No. 1,501,713 to McCaffrey, U.S. Pat. No. 734,013 to Traut and Traut, U.S. Pat. No. 955,314 to Borne, and U.S. Pat. No. 7,111,408 to Critelli and Gilliam, all use joints to significantly compact a plurality of substantially uniform segments whereby the segments are aligned and directly adjacent to one another without wasted space in the stowed configuration. Such an efficiently compacting assembly provided by the foldable rulers would be advantageous in increasing the convenience and compactability of many of the devices listed above. Yet, the collapsible structures discussed above, particularly shelter frames and various furniture pieces, must often support significant weight, for which the joints of the foldable rulers are, unsuitable, as they usually fix the ruler segments in a line with detents or through the friction of shallow complementary depressions, which are specifically designed to easily disengage under force.

Therefore, a joint is desired wherein segments connected by such joints may support significant weight, as well as efficiently compact to a stowed configuration similar to that of foldable rulers.

One way for joints to support significant weight without buckling is to comprise some type of stop mechanism whereby the segments interconnected by the joint do not rotate beyond a certain desired angle. The main related art in this area includes various stop hinges, knuckle joints, and the like, all of which comprise interconnected segments with various stopping mechanisms to inhibit rotation beyond a desired angle. Examples of stop hinges are provided in U.S. Pat. No. 2,803,850 to Hooper, U.S. Pat. No. 6,353,967 to Escobar et al., U.S. Pat. No. 2,852,802 to Seby, U.S. Pat. No. 284,008 to Hass, and U.S. Pat. No. 2,839,779 to Haag. Examples of knuckle joints are provided in U.S. Pat. No. 3,999,246 to Suska, U.S. Pat. No. 3,068,946 to Frisby, U.S. Pat. No. 3,503,130 to Ferguson, U.S. Pat. No. 4,283,811 to George, and U.S. Pat. No. 3,295,699 to Bauernschub. While most such joints would not buckle as easily as those in foldable rulers discussed above, most are still not designed to support significant weight on top except for in especially sturdy and reinforced embodiments. The main problem with the joints mentioned above, however, is that the segments interconnected by these joints generally rotate in the same plane and are thus unable to stackably fold in the same manner as the foldable rulers discussed above when 3 or more segments are interconnected by such joints.

BRIEF SUMMARY OF THE INVENTION

Therefore, a joint is desired wherein a series of substantially uniform segments interconnected by such a joint rotate in different, parallel planes and thus allow structures employing the same to efficiently compact to a stowed configuration and support significant weight.

The present invention is directed to joints, specifically, pivot joints comprising stop protrusions that rotatably fix the stop angle of substantially uniform segments interconnected by such pivot joints in respect to each other. A plurality of such segments, hereinafter referred to as brackets, interconnected by the joints, forms foldable extensions that are able to support significant weight in an extended configuration, and are also collapsible to a stowed configuration wherein the brackets are stackably aligned and directly adjacent to one another, limiting wasted space. The present invention is also directed to foldable structures, specifically foldable structures comprising foldable extensions described above and are thus able to collapse to a compact stowed configuration.

It is a primary object of this invention to provide significant and efficient compactability to various structures comprising foldable extensions to allow for efficient use of space during shipping, storage, and user transport. Another object of this invention is to allow the foldable extensions to support significant weight, thus being able to serve as support beams of various structures. These and other objects and features of the present invention will become more fully apparent from the following embodiments, structural applications, drawing descriptions, appended claims, and accompanying drawings.

A folding joint mechanism includes a first bracket and a second bracket, each having a front end and a back end; the front end having at least one laterally extending stop protrusion projecting from a side of the bracket and having a stop surface. The front end defines a front pivot point, the back end defines a back pivot point and a first edge surface. The front end of the first bracket is joined to the back end of the second bracket at the pivot points, such that the brackets pivot relative to each other between a stowed position in which the first and second brackets are adjacent each other in generally parallel, aligned orientation, and an extended position in which the second bracket is extended linearly relative to the first bracket and the stop surface of the first bracket engages the edge surface of the second bracket. In the extended position, the joint withstanding weight loads exerted on the first edge surface.

A fastener is provided for rotatably joining the pivot points. The projection is disposed on the first end so that upon engaging the first edge surface, the brackets define a stop angle. Also, in the preferred embodiment the second end forms a cam lobe for accommodating the engagement of the projection on the first edge in the extended position. In one embodiment, the cam lobe is defined by a sloped profile of the first edge from the front end to the rear end, such that the front end and the rear end have approximately the same height, which can be accomplished with other shapes as well. Thus, a height of the cam lobe is generally equal to a height of the stop protrusion on the bracket.

In one embodiment, the front end includes a fastener shaft projecting from the pivot point on the side of the bracket from which the stop protrusion extends. Also, in another embodiment, the pivot point at the back end defines a counterbore.

In another embodiment, the joint has a biasing element or spring disposed between the jointed pivot points for biasing the first bracket relative to the second bracket into the extended position.

In another embodiment, a bracket for use in a folding joint mechanism is provided, including a planar body having a front end and an opposite back end, the front end having a stop protrusion projecting from a side of the bracket and having a stop surface, the front end defining a front pivot point, the back end defining a back pivot point and a first edge surface. A central portion of the body joins the front end to the back end. At least one of the second end and the first end forms a cam lobe defined by a recess formed by the first edge, such that the front end and the rear end have approximately the same height.

In some embodiments, the first edge has at least one assembly notch. In another embodiment, the front and back pivot points are counterbored openings.

In yet another embodiment a support structure is provided, including at least one generally linear support member made up of a plurality of brackets, each bracket having a front end and a back end. The front end has a stop protrusion projecting from a side of the bracket and having a stop surface, The front end defines a front pivot point, the back end defines a back pivot point and a first edge surface In the bracket, the front end of the first bracket is joined to the back end of the second bracket at the pivot points such that the brackets pivot relative to each other between a stowed position in which the first and second brackets are adjacent each other in generally parallel, aligned orientation, and an extended position in which the second bracket is extended linearly relative to the first bracket and the stop surface of the first bracket engages the edge surface of the second bracket. In the extended position, the joint withstands weight loads exerted on the edge surface.

Along the linear support member, the projections are disposed on the corresponding first ends in non-uniform positions to define at least one of generally horizontal, generally vertical, and generally oblique portions of the support member.

Also, the projections are disposed on the front end so that upon engaging the edge surface, the brackets define a stop angle, and the plurality of brackets include individual groups of brackets defining respective stop angles in the general ranges of 180-190° and 130-140° however other angles are contemplated.

In another embodiment, the brackets include assembly notches in the edge surface between the front and back end for joining adjacent support members in intersecting relationship, defining intersecting angles. In the preferred embodiment, the intersecting angles include a first angle in the general range of 40-50°, and a second angle in the general range of 130-140°, however other ranges are contemplated.

In another embodiment, a grate is provided for use as a grill, and further including corresponding grate notches in the brackets for accommodating the grill.

Embodiments of Elements of the Joint

Stop Protrusion Embodiments

In the basic embodiment of the bracket, the stop protrusion is situated near the first or front end of the bracket and extends laterally outward from the front surface with a portion hereof in the plane of the top surface.

In another embodiment, the stop protrusion extends laterally outward from the first or front surface of the bracket near the back or second end but does not lie in the plane of the top or front surfaces. The adjacent bracket comprises a complementary stop recess that receives the stop protrusion.

In another embodiment, the front or first end of the bracket is polygonal, and the stop protrusion extends laterally outward from the front surface of the bracket near one or more sides of the partial polygon.

In another embodiment, the stop protrusion is located on the top surface of the bracket near the center to form an X-shaped bracket that may interconnect a plurality of foldable extensions.

Bracket Surface Embodiments

In one embodiment of the bracket, the basic embodiment, the top and bottom surfaces are substantially straight, with the top surface sloping downward toward the back end of the bracket to receive-the stop protrusion of the bracket.

In another embodiment of the bracket, the basic bracket is elongated or shortened, proportional to its height and/or thickness.

In another embodiment, the top and bottom surfaces of the bracket are substantially arched. The back end of the bracket includes a stop recess that receives the stop protrusion of the adjacent bracket.

In another embodiment, the bottom surface of the bracket has a wavy contour.

In another embodiment, the bracket comprises a bend at one end so as to form a polygonal shape when a plurality of such brackets is interconnected.

In another embodiment, the bracket is arched along the front and back surfaces so as to form an elliptical shape when a plurality of such brackets is interconnected.

Connection Embodiments

In one embodiment of the joint, the brackets are pivotably interconnected by an embedded rivet.

In another embodiment, the brackets are pivotably interconnected by a detached fastener.

In another embodiment, the brackets are pivotably interconnected by a helical torsion spring that serves as a fastener and exerts force on the brackets toward the extended configuration.

In another embodiment, the brackets are pivotably interconnected by at least one fastener on the front surface of the bracket Example Applications As mentioned above, the foldable extensions comprising a plurality of brackets interconnected by joints have many example structural applications, briefly described below.

In one example application, the present invention provides a foldable grill comprising plurality of foldable extensions removably interconnected to firm a support structure to which a grate is removably attached.

In another example application, the present invention provides a foldable table comprising a plurality of foldable extensions removably interconnected to form a support structure to which a tabletop is removably attached.

In another example application, the present invention provides a foldable stool comprising a plurality of foldable extensions removably interconnected to form a support structure. A support grate is removably attached to the support structure and a cushion or other planar surface is removably attached to this support grate.

In another example application, the present invention provides a foldable seating device comprising a plurality of frame elements constructed from a plurality of foldable extensions. These frame elements are interconnected by a plurality of support elements to form a support structure on which a seating cushion is removably mounted.

In another example application, the present invention provides a plurality of foldable extensions interchangeable between a foldable shelter configuration and a foldable boat configuration. The shelter configuration comprises a plurality of frame elements forming a support structure to which a shelter cover is removably attached. The foldable boat configuration comprises the same plurality of frame elements, which are reconfigured to form a more elongated support structure to which the shelter cover is removably attached as a boat skin.

In another example application, the present invention provides a foldable box spring comprising a plurality of frame elements removably interconnected by reinforcement wires and fixed together by a support grate, thus forming a support structure. A box spring is then removably mounted on top of the support structure.

In another, example application, the present invention provides a scaffolding assembly comprising a plurality of scaffolding units adjacently aligned and stacked that each include at least two foldable extensions that intersect in approximately the center to form a support structure to which a support grate is removably attached.

In another example application, the present invention provides a foldable shovel comprising a handle shaft, a handle grip, and a shovel head. The handle shaft is comprised of at least one foldable extension, but preferably comprises at least two, which are removably attached such that the folding direction of each extension is in an opposing direction from the other, thus holding the handle shaft in a substantially rigid state and preventing buckling.

The example applications above are only several of the possible applications of the joint and bracket assembly and are not intended to limit the scope of the present invention.

BRIEF DESCRIPTION OF THE SEVERAL VIEWS OF THE DRAWINGS

The above mentioned and other features of the invention will now be described with reference to the drawings of several embodiments and applications of the present invention. The illustrated examples of the joint, elements thereof, and applications therefore are intended to illustrate, but not to limit the invention. The drawings contain the following figures:

FIG. 1a is an example of related art of a foldable ruler of U.S. Pat. No. 7,111,408 to Critelli et al.

FIG. 1b is an example of related art for a stop hinge U.S. Pat. No. 2,852,802 to Seby.

FIG. 1c is an example of related art for a knuckle hinge of U.S. Pat. No. 3,503,130 to Ferguson.

DETAILED DESCRIPTION OF THE INVENTION

Figure 2:
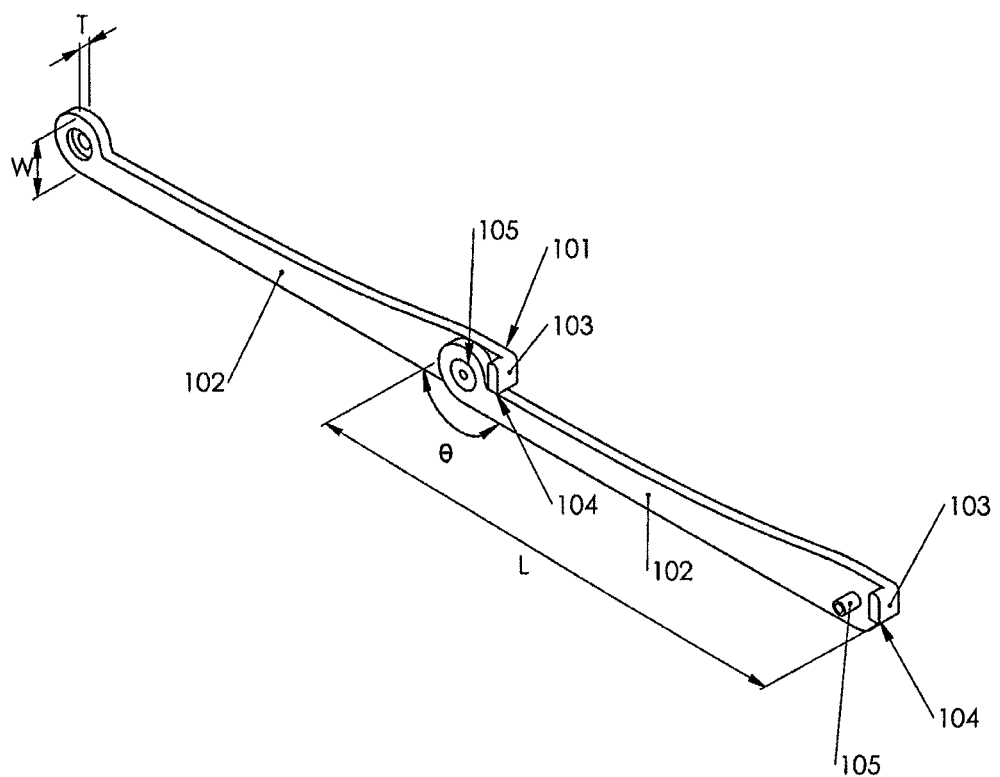
FIG. 2 is a perspective view of a joint in accordance with one embodiment of the present invention.
Figure 3A:
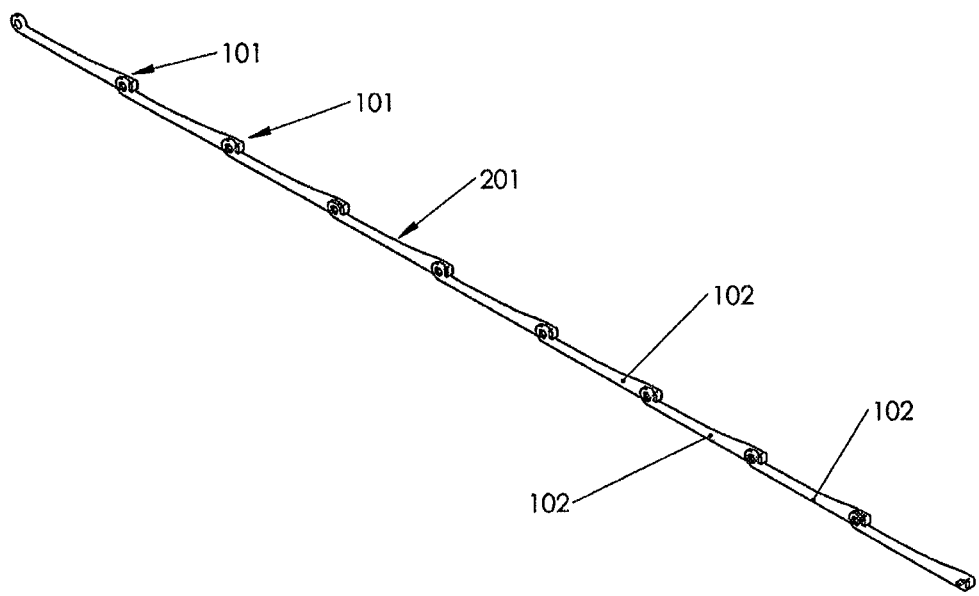
FIG. 3a is a perspective view of the extended configuration of a foldable extension comprising a plurality of the interconnected brackets and joints of FIG. 2 in accordance with one embodiment of the present invention.
Figure 3B:
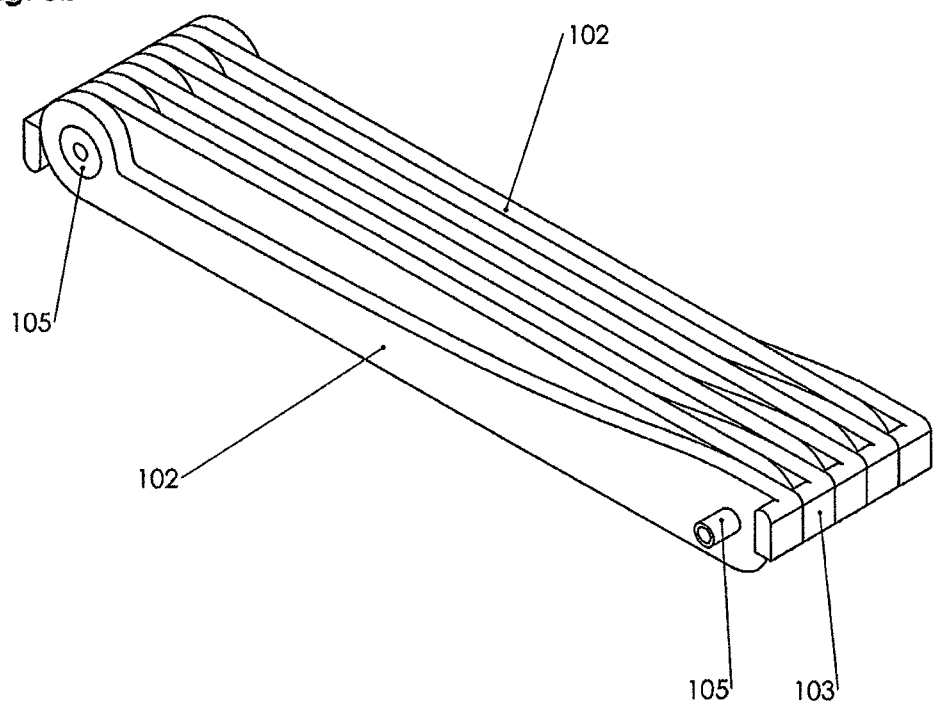
FIG. 3b is a perspective view of the foldable extension of FIG. 3a in the stowed configuration in accordance with one embodiment of the present invention.
Figure 4:
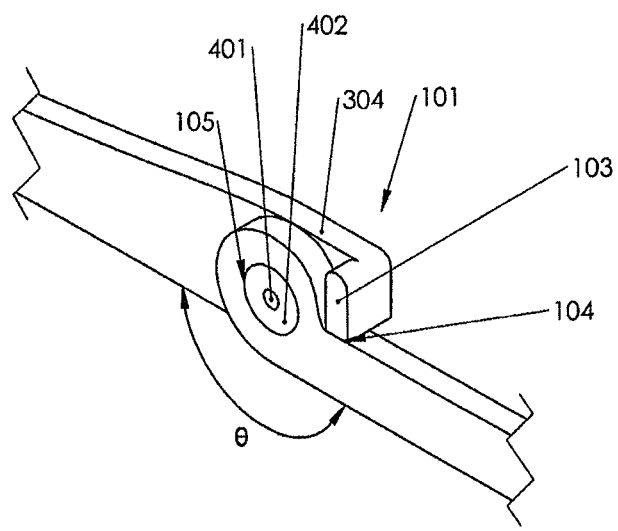
FIG. 4 is a detailed perspective view of the joint of FIG. 2 illustrating the stop protrusions hindering further outward rotation between the pair of interconnected brackets in accordance with one embodiment of the present, invention.

The following description and examples illustrate possible embodiments of the present invention in detail. Those of skill in the art will recognize that there are numerous variations and modifications of this invention that are encompassed by its scope. Accordingly, the description of the examples should not be deemed to limit the scope of the present invention.
Prior Art FIGS. 1a-1c show examples of related art discussed in the Background section. FIG. 1a illustrates an example of a foldable ruler, which stackably compacts but is unable to support significant weight. FIG. 1b illustrates an example of a stop hinge, which stops rotation of two segments interconnected by such a hinge. However, a plurality of segments interconnected by such stop hinges would lie substantially in the same plane and thus not be stackably compactable, as the foldable ruler in FIG. 1a. FIG. 1c illustrates an example of a knuckle joint, which also stops the rotation of two segments interconnected by such joints in respect to each other. Like the stop hinge in FIG. 1b, however the knuckle joint in FIG. 1c does not allow a plurality of segments interconnected by such joints to stackably compact as in the foldable ruler in FIG. 1a. Thus, while FIGS. 1a-1c are examples of related art, these FIGs also illustrate the need for a joint that allows structures employing the same to support, significant weight and efficiently compact to a stowed configuration where the segments do not pivot in the same plane and are this able to efficiently stack.
Overview of the Invention As illustrated in FIG. 2, a joint 101, generally designated is shown constructed according to the present invention. The joint 101 advantageously allows a plurality of segments, hereinafter referred to as brackets 102, pivotably interconnected by a plurality of such joints 101, to support substantial weight in the extended configuration, illustrated in FIG. 3a, and efficiently compact to a stowed configuration, illustrated in FIG. 3b. The significant weight bearing capacity and compactability is attained by advantageous stop protrusions 103 extending from a side of each bracket 102 that inhibit the rotation of the brackets 102 in respect to each other, illustrated in FIG. 4. The protrusions 103 preferably extend laterally and in some cases normally from the side of the bracket 102. An angular cut 104, shown in FIGS. 4-6, of each stop protrusion 103 determines the maximum possible angle between the brackets, hereinafter referred to as the stop angle θ. This rotation stoppage allows a plurality of brackets 102 interconnected by such joints 101 to form foldable extensions 201, illustrated in FIG. 3a, which can fold to a substantially stacked disposition for the stowed configuration in FIG. 3b. In the stowed configuration, the brackets 102 are pivoted away from the stop protrusions 103 so as to be aligned and adjacently stacked. This process significantly reduces the size of the foldable extensions 201 from the extended configuration in FIG. 3a, advantageously facilitating shipping, storage, and user transport. In the stowed configuration, moreover, the stop protrusions advantageously aid in holding the folded brackets in place, although a fastening element such as a ribbon, a rope, a wire, a clip, a sleeve, or some other fastening element may be desirable to further prevent unfolding.

Figure 5:
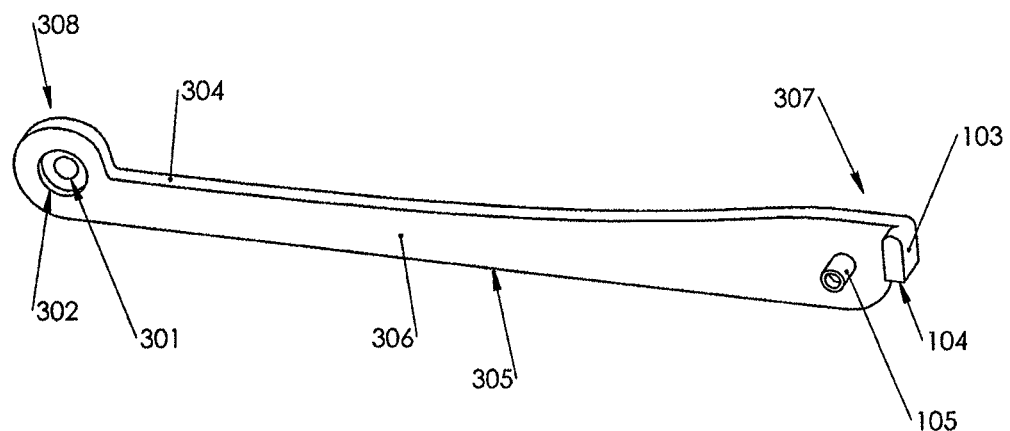
FIG. 5 is a detailed perspective view of the bracket of FIG. 2 in accordance with one embodiment of the present invention.
Figure 7:
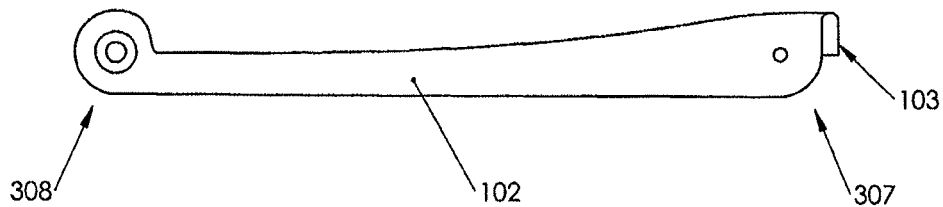
FIG. 7 is a side view of the bracket of FIG. 2 comprising a stop protrusion with an angular cut of 180° in accordance with one embodiment of the present invention.
Figure 8A:
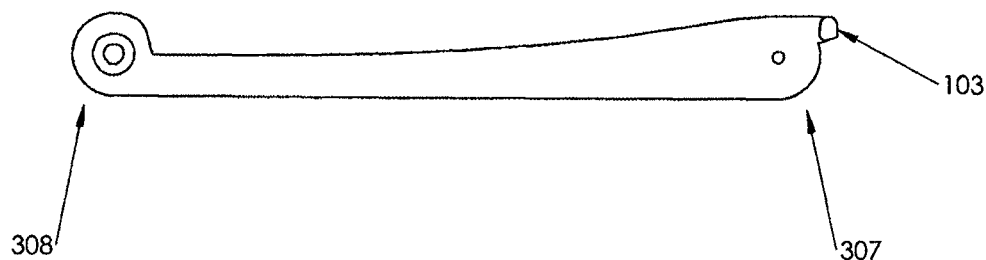
FIG. 8a is a side view of a bracket comprising a stop protrusion with an angular cut of 200° in accordance with one embodiment of the present invention.
Figure 8B:
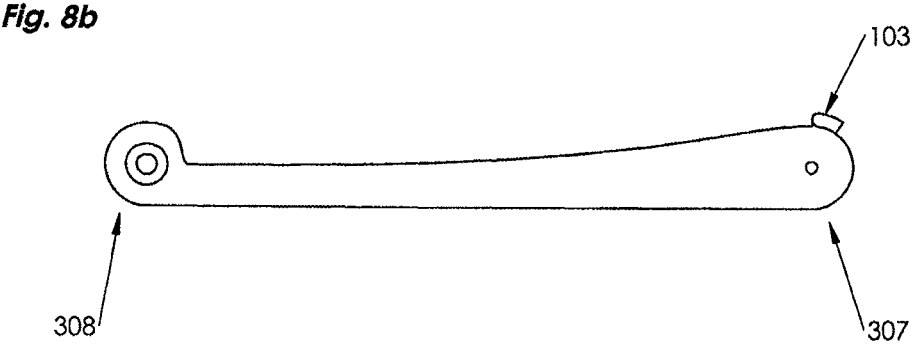
FIG. 8b is a side view of a bracket comprising a stop protrusion with an angular cut of 235° in accordance with one embodiment of the present invention.
Figure 8C:
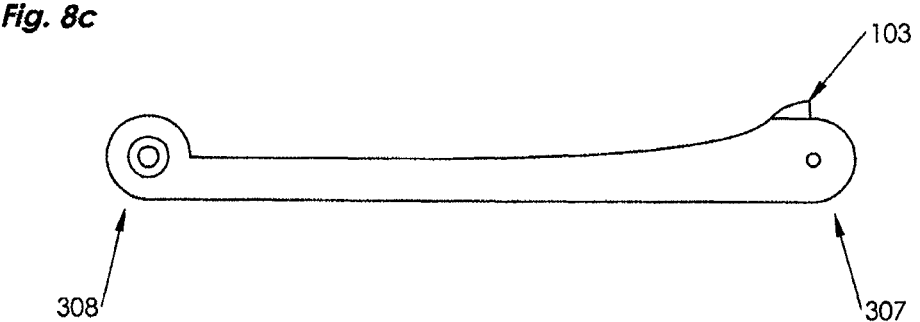
FIG. 8c is a side view of the bracket of FIG. 2 comprising a stop protrusion with an angular cut of 254° in accordance with one embodiment of the present invention.
Figure 8D:
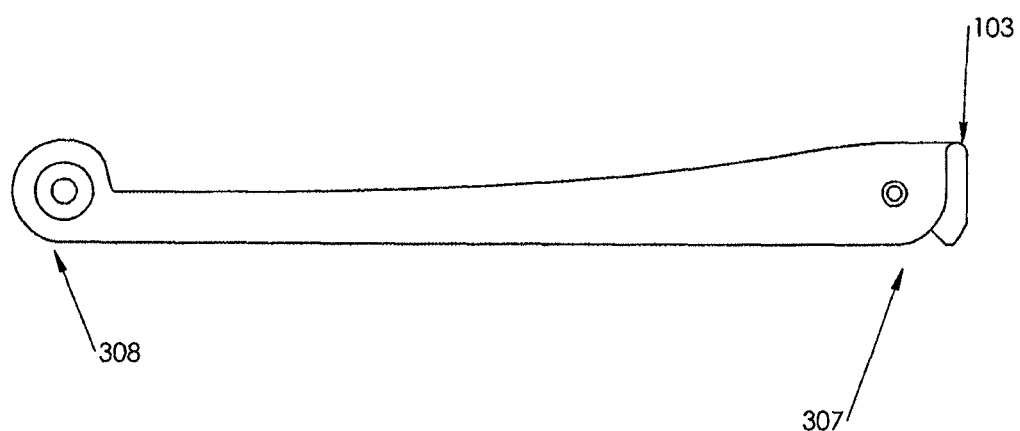
FIG. 8d is a side view of the bracket of FIG. 2 comprising a stop protrusion with an angular cut of 135° in accordance with one embodiment of the present invention.
Figure 8E:
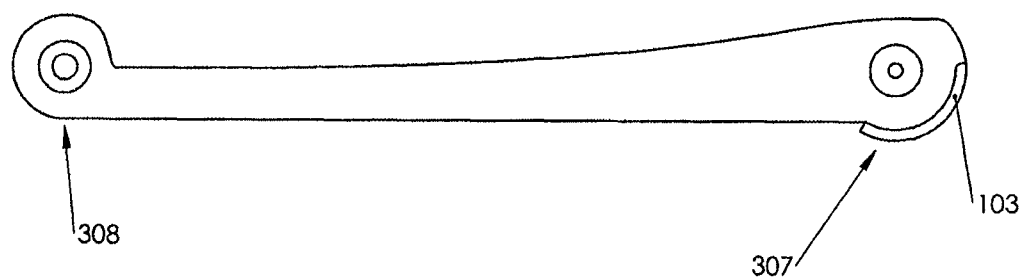
FIG. 8e is a side view of the bracket of FIG. 2 comprising a stop protrusion with an angular cut of 60° in accordance with one embodiment of the present invention.

The foldable extensions 201 may be employed in various structures, illustrated in the example applications in FIGS. 19-28d, for which compactability may be advantageous. Some example applications include: furniture including but not limited to tables, as in FIG. 22c. stools, as in FIG. 23b, chairs, as in FIG. 24d, box springs, as in FIG. 26c, and shelving units; cooking apparatuses including but not limited to grills, as in FIG. 20a, skewers, and spits, structural support examples including but not limited to trellises, gazebos, shelter frames, as in FIG. 25a, boat frames, as in FIG. 25d, walkers, and clothes racks; construction equipment including but not limited to scaffolding, as in FIG. 27c, and ladders; space equipment including but not limited to deployable support structures; handle examples including but not limited to brooms, shovels, as in FIG. 28a, and rakes; and various, toys and toy, building sets. As those of skill in the art will recognize, the joint 101 may be employed in many other structures with elongated sections for which compactability may be advantageous. The embodiments variations, and example applications of the joint 101 are described below.
Stop Protrusion Variations As illustrated in FIG. 5, the stop protrusions 103 mentioned above extend outwardly from and preferably normally to, but at least laterally from a front or side surface 306 of each bracket 102 near the front end 307 in the basic embodiment. In the present application, "front" and "rear" are used to distinguish ends or sides of articles from one another and are not intended to limit the orientation of the bracket or the described article. Those of skill in the art, however, will appreciate that this stop protrusion 103 may be placed elsewhere, such as on an alternate surface or alternate location on the front surface 306 of the bracket 102, as illustrated in the examples of FIGS. 7-11c, and described in detail in a later section. The stop protrusion 103 is preferably of width W less than or substantially equal to the thickness T of the bracket 102 so as to allow the brackets 102 to be adjacently stacked without hindrance. During rotation, the stop protrusion 103 of one bracket 102 abuts with the first edge surface or top surface 304 near the back end 308 of the adjacent bracket 102, fixing the brackets 102 with respect to each other at one or more predetermined stop angles θ. In the preferred embodiment, the back end 308 has a cam lobe shape (see, for example, the arcuate outer periphery of the back end 308 shown in FIGS. 4 and 5) which defines a cutout portion of the bracket to define the corresponding top surface 304, however other configurations are contemplated to suit the application, and as seen in the drawings of this application. Those of skill in the art will recognize that the stop angle θ may be varied in numerous ways. For example, a second edge surface or bottom surface 305 of the stop protrusion 103, hereinafter referred to as the angular cut 104, may be modified to abut to the adjacent bracket 102 at a different stop angle 80. In addition, the top surface 304 of the bracket 102 may also be modified to abut to the stop protrusion 103 at a different stop angle θ. Another way to modify the stop angle θ is to vary the location of the stop protrusion 103. FIGS. 7-8e illustrate examples locations of the stop protrusion 103, and the stop angles θ these arrangements produce. Various combinations of stop angles θ may be desirable depending on the application, yielding arcs, discrete bends, or other advantageous forms and features to the foldable extensions 201, as illustrated in the example applications in FIGS. 19-28d. Those of skill in the art will recognize that the example ways of modifying the stop angle θ discussed above are not exhaustive, as many other ways may exist.

Figure 9A:
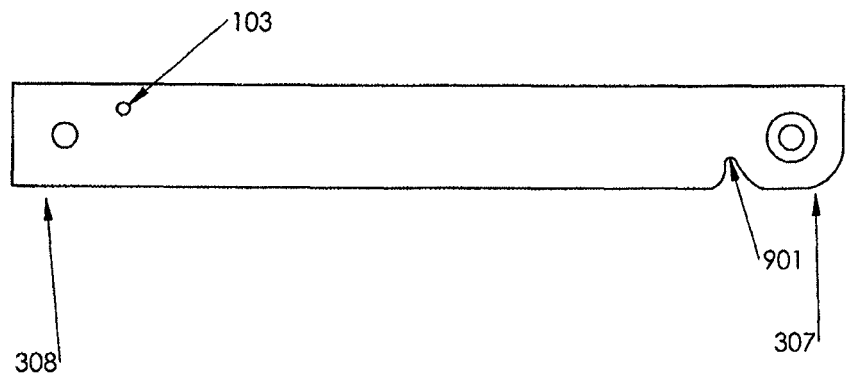
FIG. 9a is a side view of a bracket comprising a stop protrusion on the front surface near the back end and a stop recess near the front end in accordance with one embodiment of the present invention.
Figure 9B:
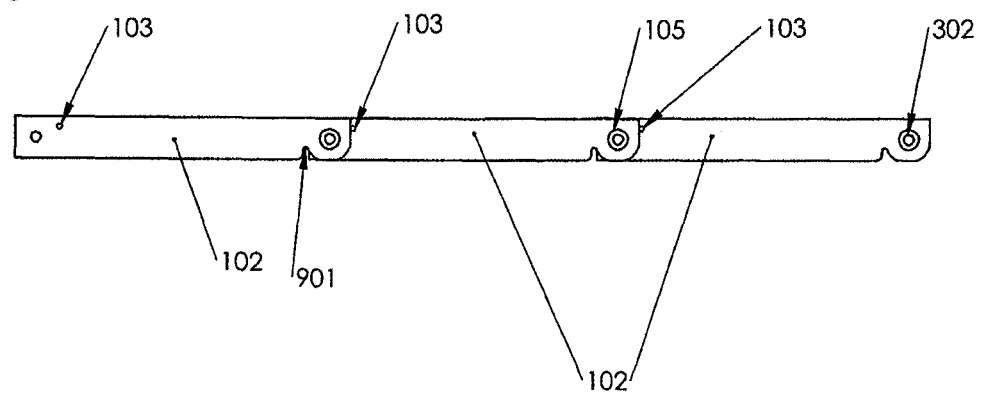
FIG. 9b is a side view of a foldable extension comprising a plurality of the brackets of FIG. 9a in accordance with one embodiment of the present invention.
Figure 9C:
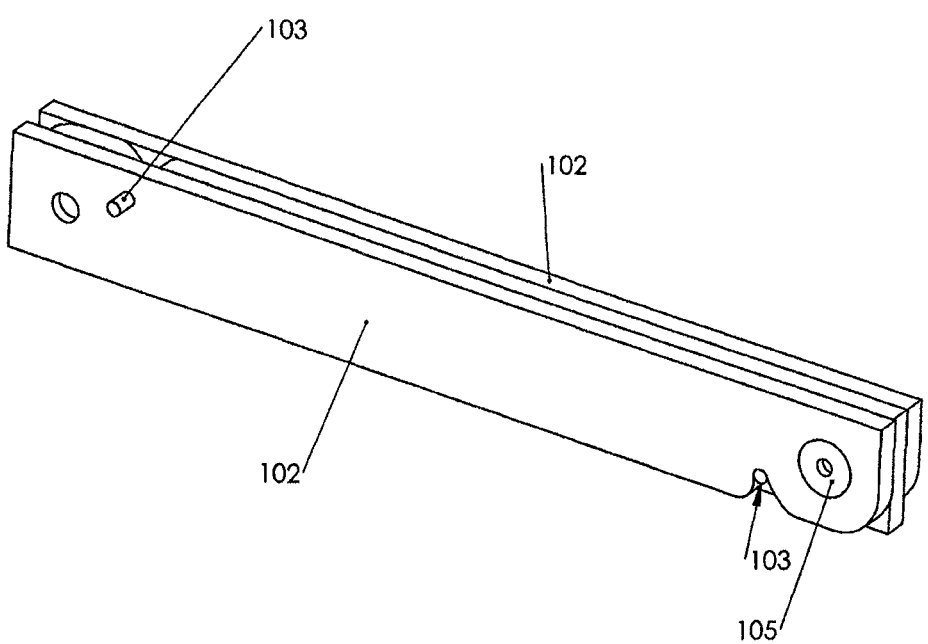
FIG. 9c is a perspective view of the foldable extension of FIG. 9b in the stowed configuration in accordance with one embodiment of the present invention.

While the alternative placement of the stop protrusions 103 may serve to modify the stop angle θ, those of skill in the art will recognize that alternative stop protrusion placements may serve other functional and aesthetic purposes as well. For example, FIG. 9a illustrates a bracket 102 with the stop protrusion 103 located on the front surface 306. While the stop protrusion 103 in FIG. 4 abuts with the top surface 304 of the adjacent bracket 102, the front end 307 of the bracket of FIG. 9b abuts with the stop protrusion 103 in the front surface 306 of the adjacent bracket 102. FIG. 9c illustrates the stowed configuration of the foldable extension of FIG. 9b with the stop recession 701 in the bottom surface 305 receiving the stop protrusion 103. Those of skill in the art will appreciate that in this arrangement, the stop angle θ may be modified in various ways, by changing the location of the stop protrusion 103, for example, as well as modifying the size or angular cut 104 of the stop protrusion 103. This stop protrusion 103 arrangement may be advantageous in terms of manufacturing, as the bracket 102 remains a uniform thickness 'T' throughout and thus may, for example, be formed out of a single sheet of metal with the stop protrusion 103 subsequently attached. The bracket may also be formed, and the stop protrusion may be attached in an alternative manner, if desired.

Figure 10A:
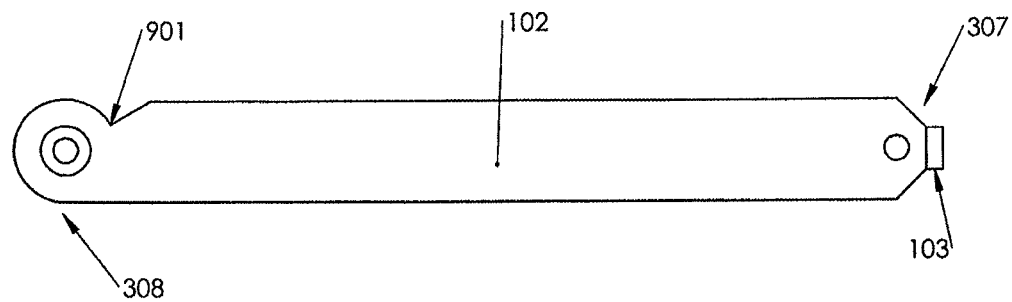
FIG. 10a is a side view of a polygonal bracket in accordance with one embodiment of the present invention.
Figure 10B:
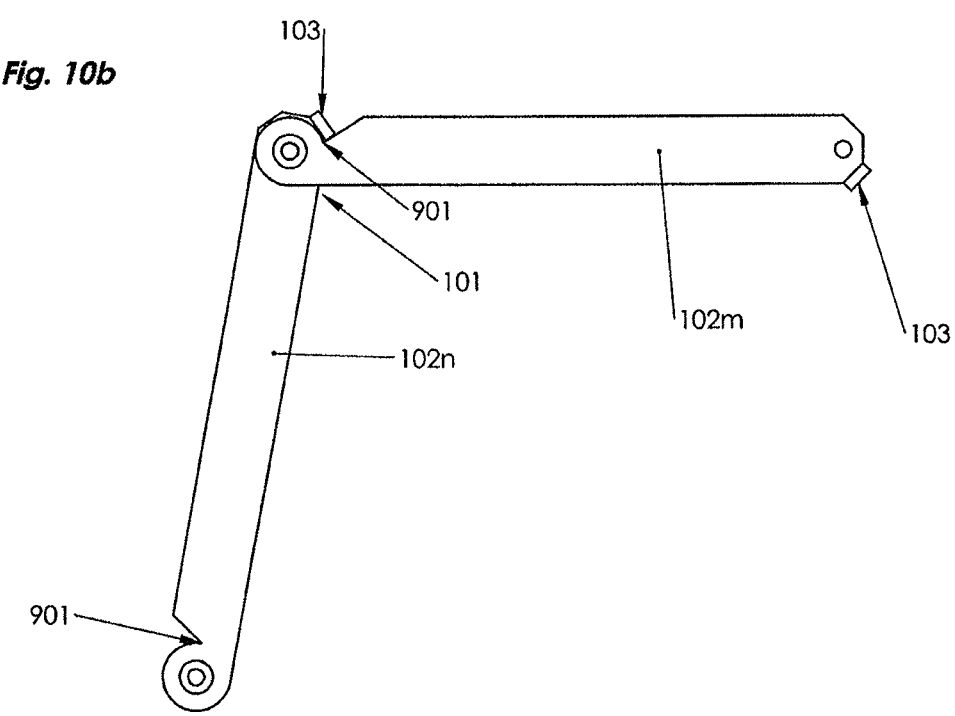
FIG. 10b is a side view of the joint of FIG. 2 connecting a pair of the polygonal brackets of FIG. 10a in accordance with one embodiment of the present invention.
Figure 10C:
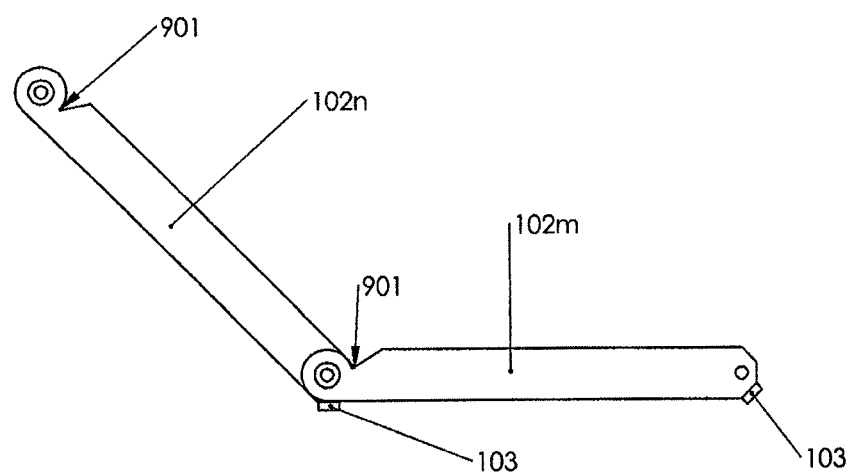
FIG. 10c is a side view of the pair of the polygonal brackets of FIG. 10a rotated counterclockwise so as to abut to each other at an alternative stop angle in accordance with one embodiment of the present invention.

Another advantageous arrangement of the stop protrusion 103 is illustrated in FIG. 10a, which shows how the front end 307 of the bracket 102 may be formed into a partial polygon. The stop protrusions 103 may then be welded or otherwise attached to the sides of this partial polygon, and a receiving area 901 may be added to receive the stop protrusion 103. In this arrangement, brackets 102 may be manufactured without the stop protrusions 103, which may be subsequently attached where desired to the sides of the partial polygon. FIG. 10a illustrates a partially octagonal front end, with the top 304 and bottom 305 surfaces of the bracket forming the top and bottom sides of the octagon and the three sides of the front end 307 forming the other ⅜ of the partial octagon. An alternative manufacturing technique is to form notches in the polygon sides of the front end, then insert and weld, adhere, or otherwise attach the stop protrusions into the notches to advantageously increase the load-bearing capacity thereof. Other methods of including the stop protrusion 103 within the brackets 102 may also be used. FIG. 10b illustrates a joint 101 connecting a pair of such polygonal brackets 102m and 102n and showing how the stop protrusion 103 hinders further rotation between these brackets 102m and 102n, similarly to the joint 101 of FIG. 4. As illustrated, in FIG. 10c, a pair of the brackets 102 of FIG. 10a may advantageously be pivoted in the opposite direction as well so as to create an alternative stop angle. FIG. 10b illustrates how bracket 102n is unable to further rotate clockwise due to the stop protrusion 103. However, if it is rotated counterclockwise, its stop protrusion will, eventually abut to the bottom surface 305 of bracket 102m, creating an alternative stop angle θ. This arrangement thus advantageously allows one pair of brackets 102m and 102n to form at least two different stop angles θ. While the stop protrusions 103 illustrated in FIGS. 10a-10c are equal to the length of each polygonal side, those of skill in the art will appreciate that these stop protrusions 103 may alternatively be formed shorter so as to attain a greater possible range of stop angles θ. Those of skill in the art will further appreciate that the sides of the polygonal front end 307 may be varied in terms of number, dimension, size, and other characteristics, depending on the desired embodiment and application.

Figure 11A:
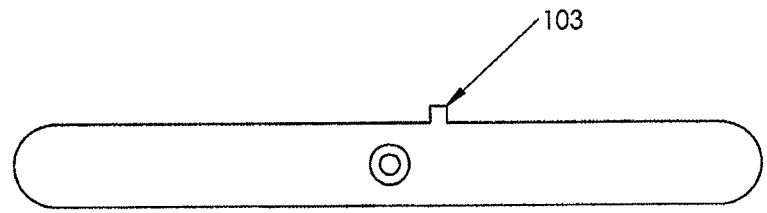
FIG. 11a is a side view of an x-connection bracket in accordance with one embodiment of the present invention.
Figure 11B:
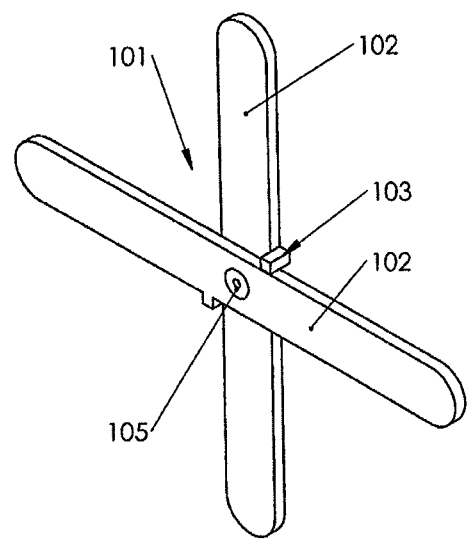
FIG. 11b is a perspective view of the joint of FIG. 2 connecting a pair of x-connection brackets in accordance with one embodiment of the present invention.
Figure 11C:
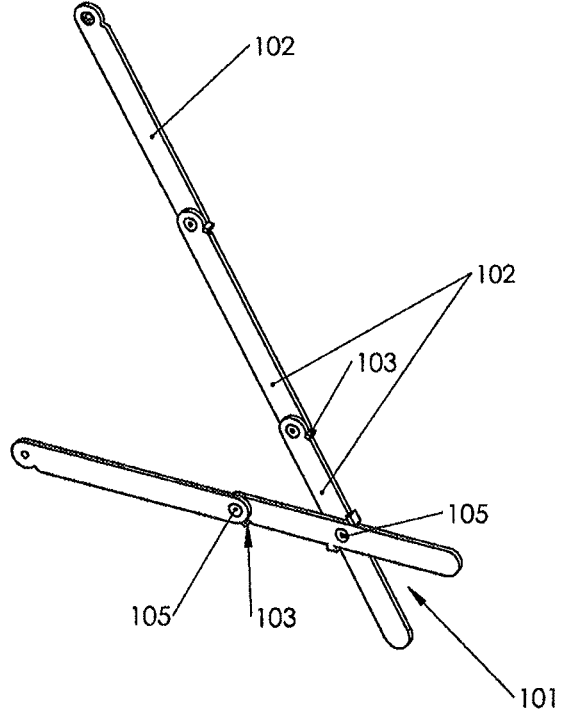
FIG. 11c is a perspective view of the pair of x-connection brackets of FIG. 11b with an attached foldable extension in accordance with one embodiment of the present invention.

FIG. 11a illustrates that the stop protrusion 103 may also be placed along the top surface 304 of the bracket 102, allowing for two foldable extensions 201 to be pivotably interconnected and rotate with respect to each other up to a predetermined angle. FIG. 11b shows a pair of two such brackets, hereinafter referred to as x-connection brackets, interconnected by a joint 101. Advantageously, in such an arrangement, the stop protrusion 103 on each of the two x-connection brackets 102 contributes to hindering the rotation, thus reducing the force on each stop protrusion 103. FIG. 11c illustrates an example pair of foldable extensions 201 interconnected by the joint 101 in FIG. 11b. It is important to note that the brackets 102 within the foldable extensions 201 are not x-connection brackets 102 but the brackets 102 of FIG. 2, with the stop protrusion located on the front end 307. Those of skill in the art will recognize, however, that these brackets are fundamentally similar in function and that any combination of bracket 102 embodiments may be employed within the foldable extensions 201 and within the joints 101 connecting these foldable extensions 201

Bracket Variations

Figure 12A:
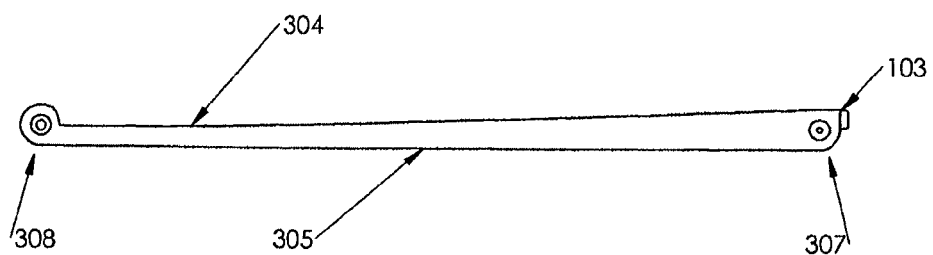
FIG. 12a is a side view of an elongated bracket in accordance with one embodiment of the present invention.
Figure 12B:
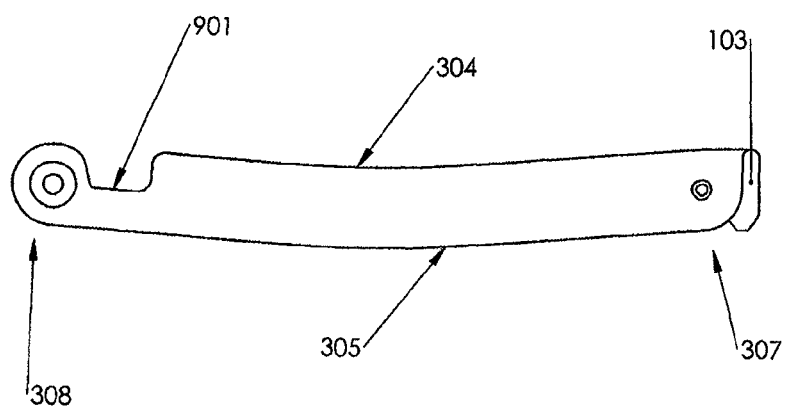
FIG. 12b is a side view of an arched bracket in accordance with one embodiment of the present invention.
Figure 12C:
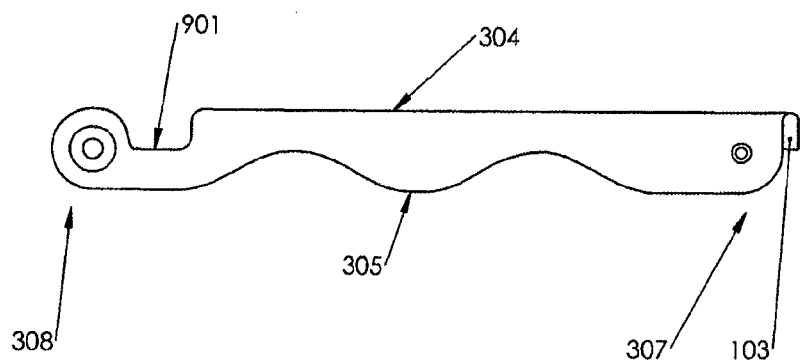
FIG. 12c is side view of a wavy-edged bracket in accordance with one embodiment of the present invention.

The location of the stop protrusion 103 may influence the shape of the bracket 102, as illustrated in FIGS. 9a-11c, described above. Moreover, those of skill in the art will recognize that the shape of the bracket 102 may also be altered independently of the stop protrusion 103, as illustrated in FIGS. 12a-12c. FIG. 12a shows how the length of the basic bracket 102 embodiment of FIG. 5 may be altered, depending on the desired embodiment and application. FIG. 12b illustrates a bracket 102 with the top 304 and bottom 305 surfaces arched, and with the top surface including a stop recess 901 near the back end 308. FIG. 12c illustrates how the top 304 and bottom 305 surfaces may be significantly different, with the top surface 304 fully flat, and the bottom surface 305 waved in this example.

Figure 13A:
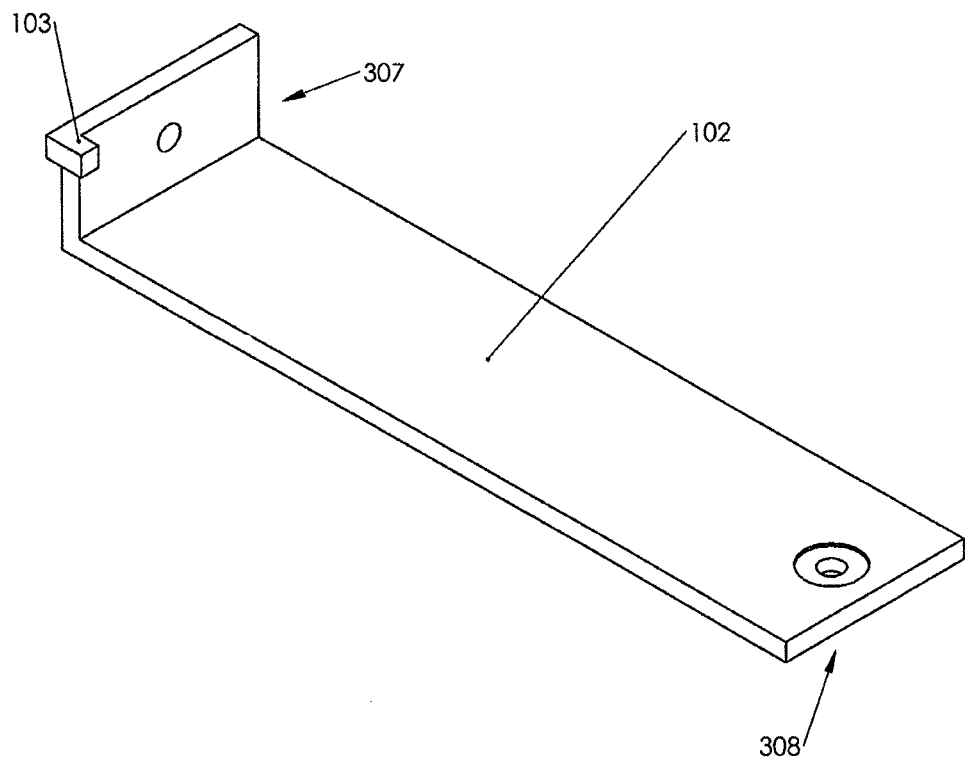
FIG. 13a is a perspective view of a cornered bracket in accordance with one embodiment of the present invention.
Figure 13B:
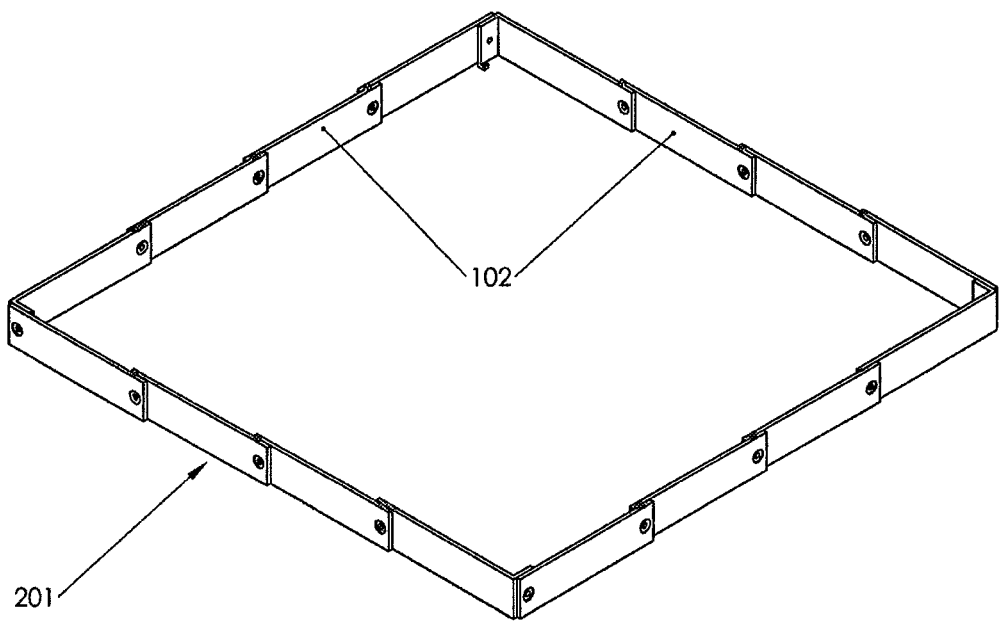
FIG. 13b is a perspective view of the extended configuration of a rectangular foldable extension comprising a plurality of the cornered brackets of FIG. 13a in accordance with one embodiment of the present invention.
Figure 13C:
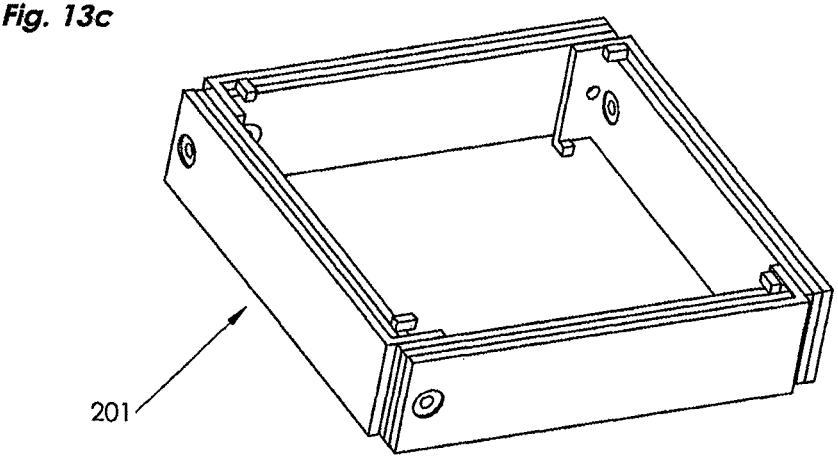
FIG. 13c is a perspective view of the rectangular foldable extension of FIG. 13b in the stowed configuration in accordance with one embodiment of the present invention.
Figure 14A:
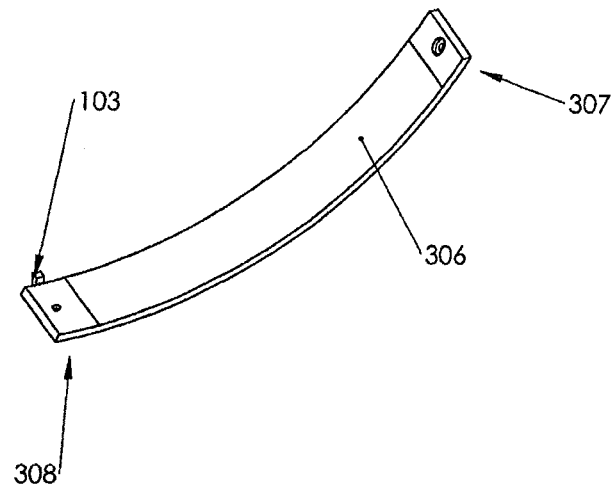
FIG. 14a is a perspective view of a curved bracket in accordance with one embodiment of the present invention.
Figure 14B:
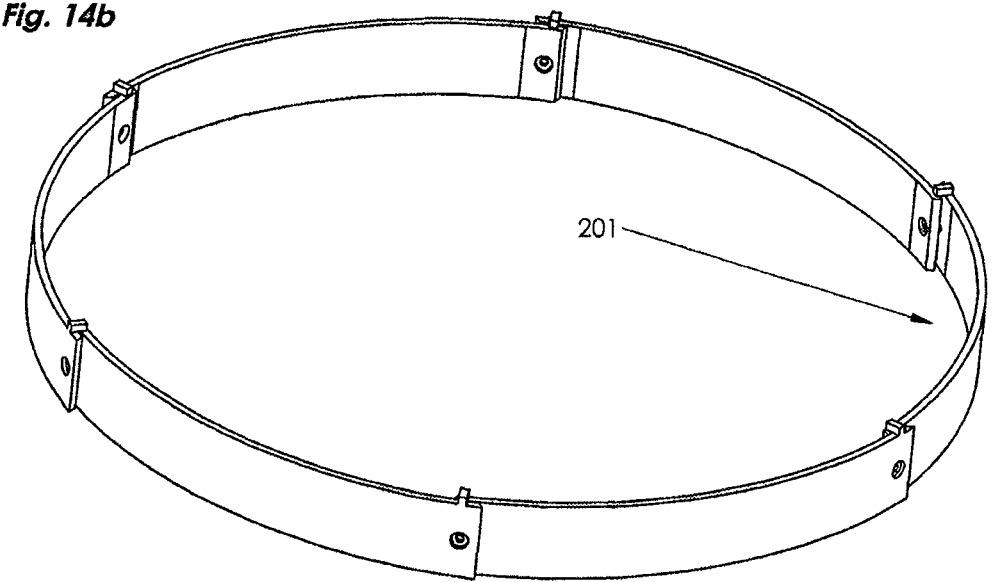
FIG. 14b is a perspective view of an elliptical foldable extension formed of a plurality of the brackets of FIG. 14a in accordance with one embodiment of the present invention.
Figure 14C:
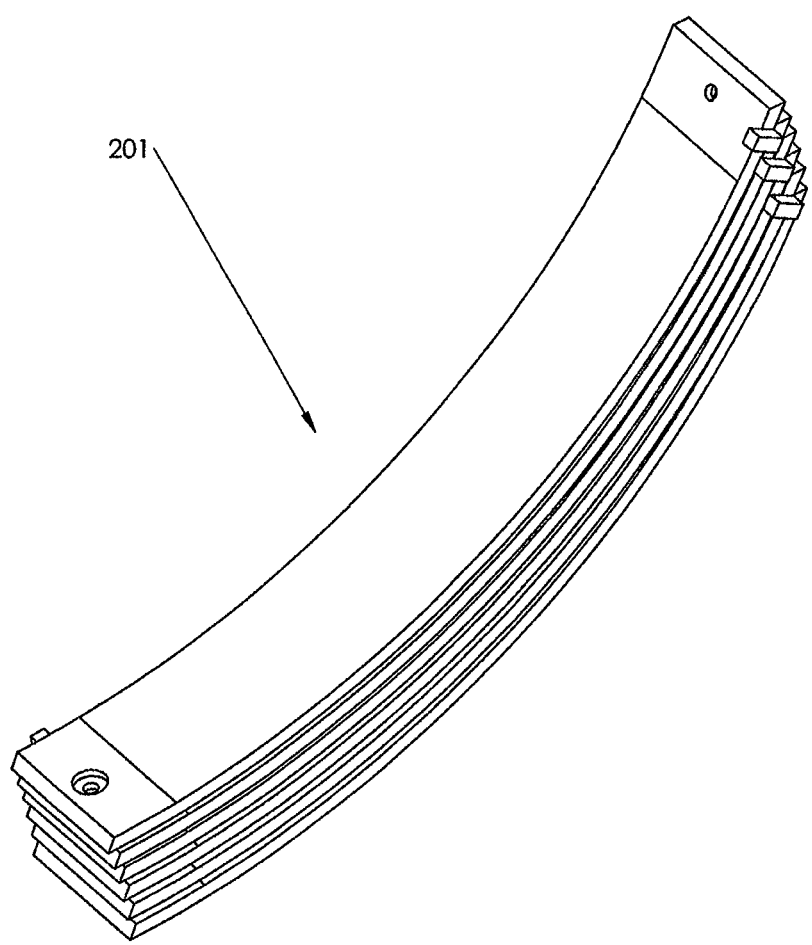
FIG. 14c is a perspective view of the elliptical foldable extension of FIG. 14b in the stowed configuration in accordance with one embodiment of the present invention.

FIGS. 13a-14c illustrate examples of a bracket 102 varied in a different dimension than those described above. FIG. 13a illustrates a cornered embodiment of the bracket 102, with a bend near the front end 307 so as to create a rectangular foldable extension 201 in FIG. 13b, which folds a rectangular stowed configuration in FIG. 13c. The space in the center of this rectangular stowed configuration may be employed to stow one or more other foldable extensions such as that shown in FIG. 3b, to increase compactability, as foldable structures may employ a plurality of various types of foldable extensions 201. Similarly, FIG. 14a shows a curved bracket 102 that forms an elliptical foldable extension 201 in FIG. 14b and compacts to an arched stowed configuration in FIG. 14c. Many alternative embodiments of the brackets 102 exist, as many features of the brackets 102 may be varied in form and location, and other features, such as recesses and protrusions, may be added depending on the desired application. Those of skill in the art will appreciate that the bracket 102 variation examples in FIGS. 12a-14c demonstrate that the form of the brackets 102 may be modified while maintaining the fundamental function of the joint 101.

Figure 29A:
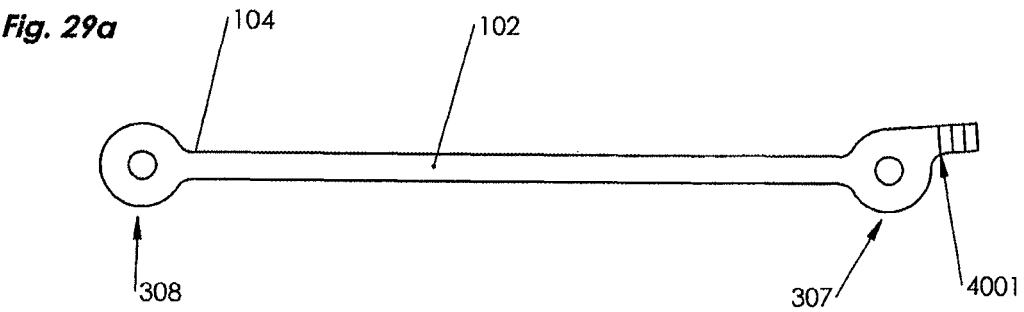
FIG. 29a is a side view of a bracket optimized for manufacture in accordance with one embodiment of the present invention.
Figure 29B:
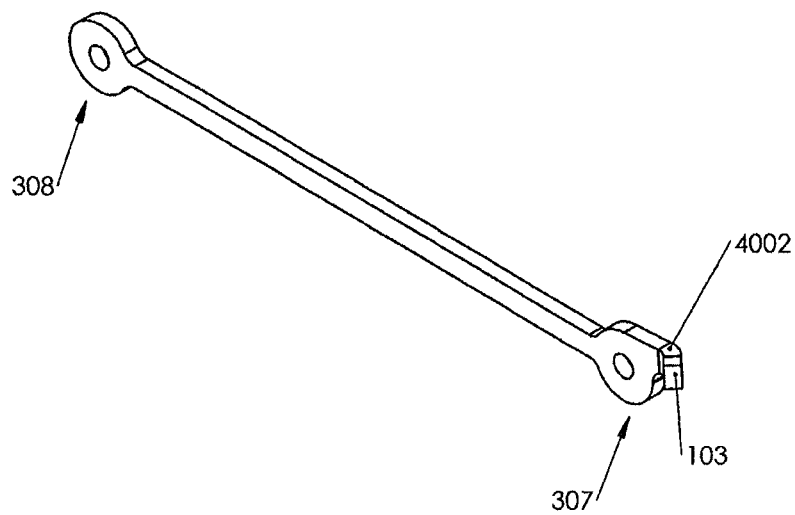
FIG. 29b is a perspective view of FIG. 29a that shows how the angle of the stop protrusion need not be 90° in accordance with one embodiment of the present invention.

FIGS. 29a and 29b illustrate a bracket designed for lightness and ease of large-volume manufacturing. The stop surface 104 is positioned so that it is indistinguishable from the body of the bracket. By using an angle greater than 90° for 4001, the bracket is able to maintain a more uniform shape. The stop protrusion 103 in this case extends laterally, but not normally, at 4002 to ease manufacture. In fact, the stop protrusion need only protrude laterally some amount greater than 0° in order for it to lock against the stop surface of the next bracket.

Figure 30:
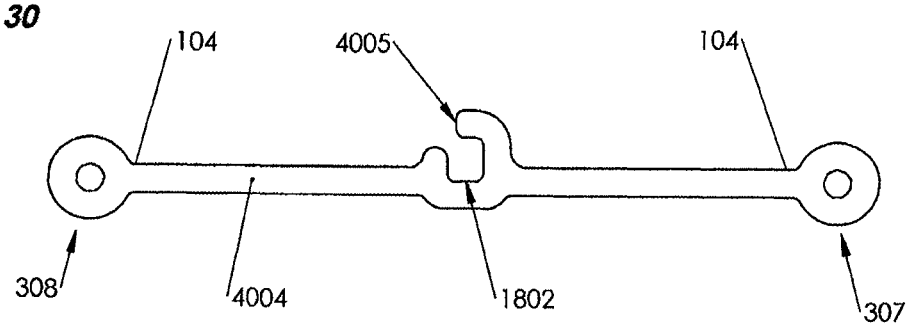
FIG. 30 is a side view of a hub bracket that contains a self-locking assembly notch and allows for symmetric foldable extensions to be used to create a symmetric support structure in accordance with one embodiment of the present invention.

FIG. 30 illustrates hub bracket 4004 to which other brackets can lock. Because the stop surfaces 104 are collinear with the body of the bracket, this hub can be inverted and used as both the top and bottom intersecting brackets instead of having to produce a unique top and unique bottom. When assembly notch 1802 is used to complement itself, protrusion 4005 prevents the intersecting brackets from slipping out of one another.

Figure 31:
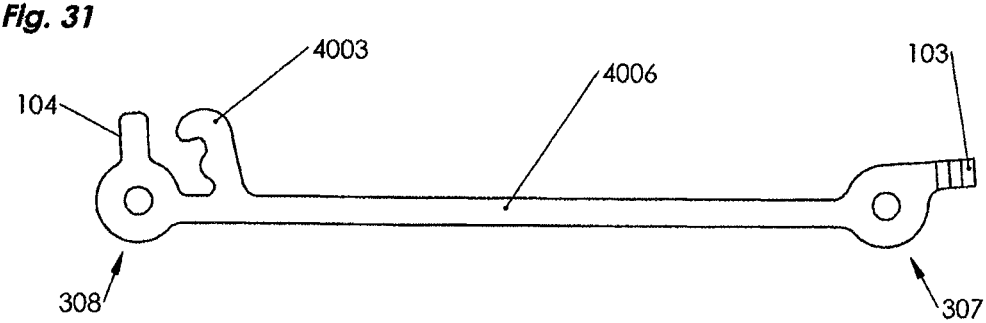
FIG. 31 is a side view of a bracket that has a hook for attaching a grate for a grill assembly and a stop angle of 90° allowing a generally vertical support member to transition into a generally horizontal support member while still allowing stowage as one assembly in accordance with one embodiment of the present invention.

FIG. 31 illustrates corner bracket 4006. The stop surface 104 creates an approximately 90° bend to allow for generally vertical and generally horizontal sections of a structure to be achieved using a single chain of brackets. The hook 4003 is here used in lieu of a grate notch for a grill assembly.

Figure 33:
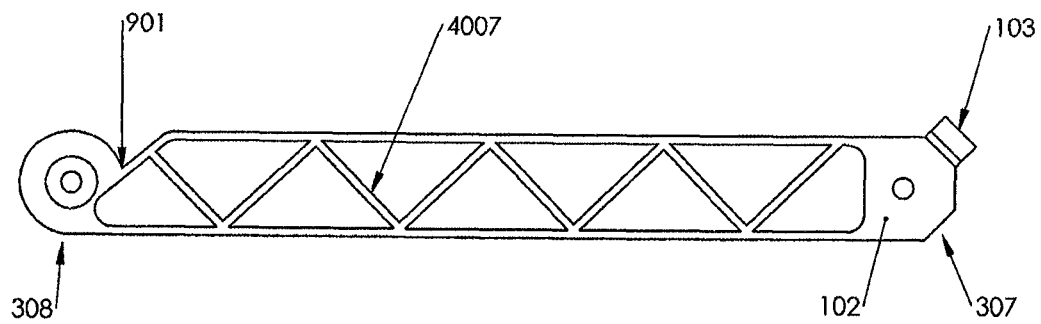
FIG. 33 is a side view of a bracket from which much material has been removed to save weight, but which maintains strength with a truss structure in accordance with one embodiment of the present invention.
Figure 34:
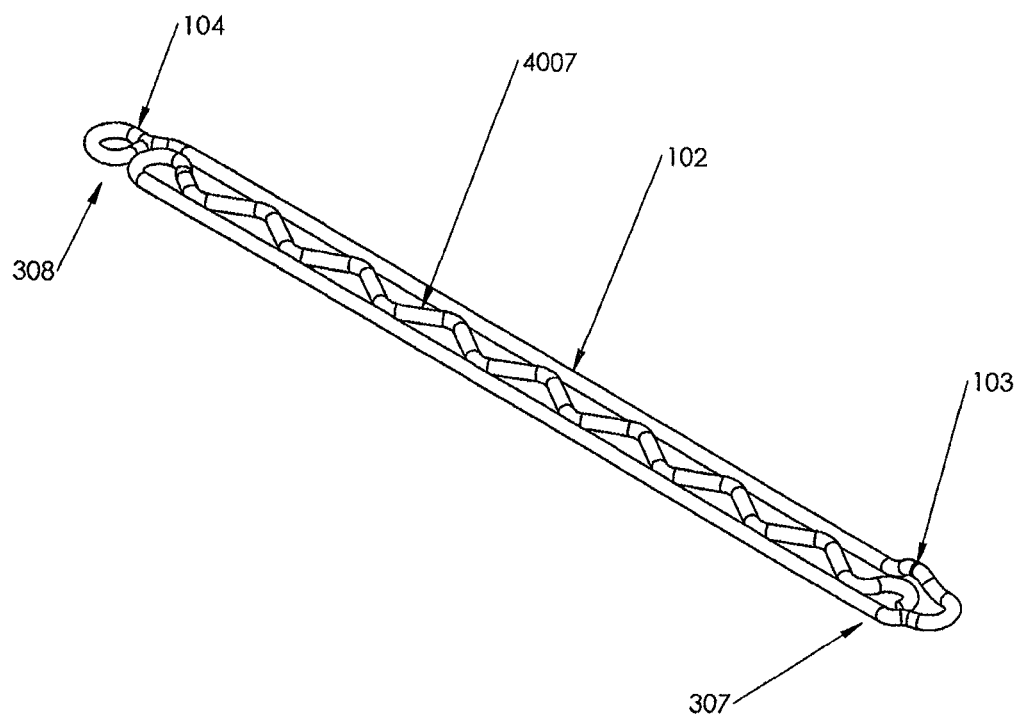
FIG. 34 is a perspective view of a truss-style bracket formed from a wire rather than a flat piece of material in accordance with one embodiment of the present invention.

Furthermore, though the brackets shown are solid, uniform sections, portions of the interior material can be removed for weight reduction while not significantly altering the performance of the brackets. A truss structure 4007, as illustrated in FIGS. 33 and 34, would allow for substantially less material to be used while maintaining structural integrity. Other geometry, including, but not limited to flanges, ridges, and bends, can be used to improve the rigidity of the brackets and entire bracket structures.

FIG. 34 illustrates a bracket made from a single wire, welded in place. Those of skill in the art will recognize that a bracket can be made from a variety of materials and methods and still achieve the same purpose as one made from a flat piece.

Figure 6:
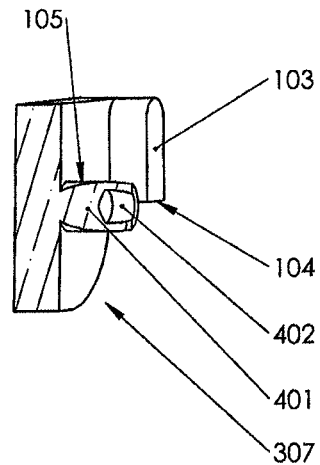
FIG. 6 is a cross sectional detailed view of the embedded rivet shaft of FIG. 2 in accordance with one embodiment of the present invention.
Figure 15A:
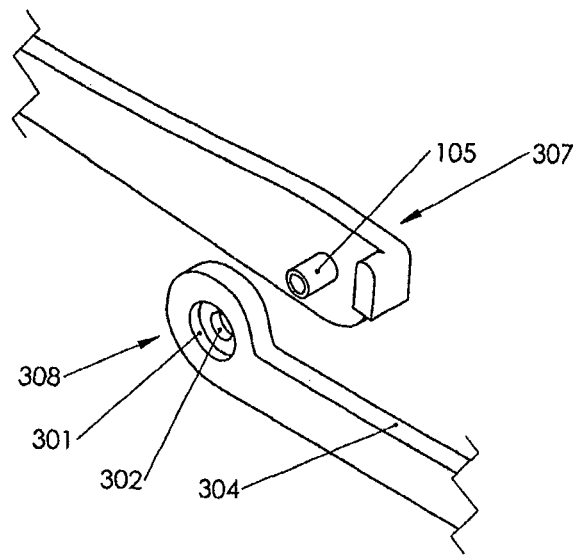
FIG. 15a is an exploded detailed perspective view of the joint in FIG. 2 comprising an embedded rivet in accordance with one embodiment of the present invention.
Figure 15B:
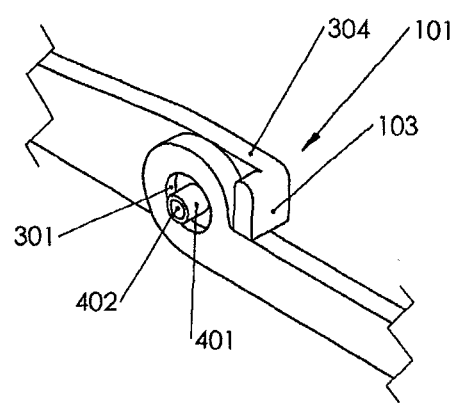
FIG. 15b is a detailed perspective view of the joint of FIG. 2 before rivet compression.
Figure 15C:
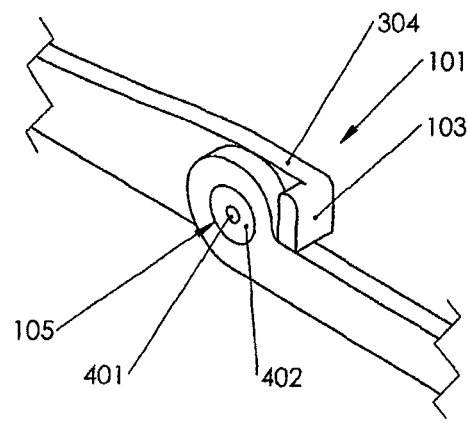
FIG. 15c is a detailed perspective view of the joint of FIG. 2 after rivet compression.

To pivotably connect the brackets 102 to one another, in the basic embodiment, each bracket 102 comprises an embedded rivet or shaft 105 wherein the front end 307 of the bracket 102 includes the shaft 105, as illustrated in detail in FIG. 6, extending outwardly in a substantially perpendicular fashion to the front surface 306 of the bracket 102. The shaft 105 advantageously comprises at least two sections, shown in FIGS. 5-6. As FIG. 6 illustrates in greater detail, the first section is solid 401 having length substantially equal to the thickness T of one bracket 102, and the second shaft section is hollow 402 with length approximately ½ or ⅓ of the solid section 401, although these ratios may be varied depending on the desired embodiment and application. As illustrated in FIG. 15a, during the manufacturing process, the entire shaft 105, comprising both sections, is inserted into a fastener hole 302 of the adjacent bracket 102, whereby the hollow section 402 protrudes slightly above, illustrated in FIG. 15b. This protruding hollow section 402 is compressed and thereby laterally expanded to pivotably interconnect the brackets 102, illustrated in FIG. 15c. During the compression process, the advantageous hollowness of the hollow shaft section 402 absorbs most of the compression force, thereby preventing the solid section 401 from also expanding outward and thus hindering pivotability. Once compressed, the hollow section 402 expands into a shallow fastener depression 301 around the fastener hole 302 so as to lie flat with the front surface 306 of the bracket 102 and not impede rotation. Those of skill in the art will appreciate that while the shaft 105 described above has comprised two sections, one solid 401 and one hollow 402, the shaft 105 may alternatively be fully solid, fully hollow, or comprise a combination of solid and hollow sections depending on desired application and example. If extra pivotal friction is desired, for example, the shaft 105 may be fully solid so as to expand into the fastener holes 302 during compression, thereby reducing ease of rotation.

Figure 16A:
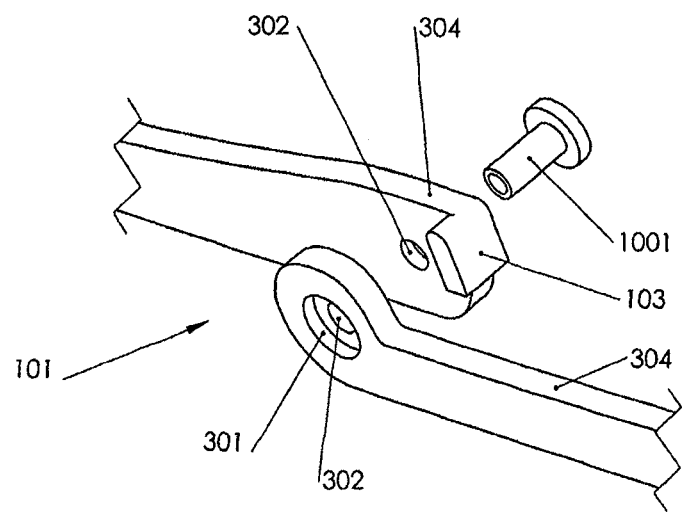
FIG. 16a is a perspective exploded front view of the joint of FIG. 2 connecting a pair of brackets comprising separate fasteners in accordance with one embodiment of the present invention.
Figure 16B:
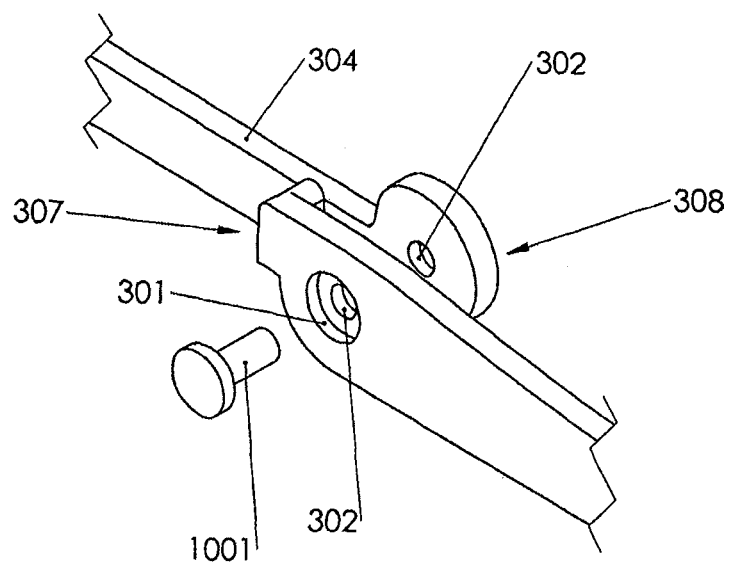
FIG. 16b is a perspective back view of the joint of FIG. 2 illustrating a fastener depression.

In another embodiment, if separate, rather than embedded, fasteners may be desired, as illustrated in FIG. 16a, the joints 101 comprise fasteners 1001 that extend through two fastener holes 302 disposed toward respective ends of the brackets 102 being joined. These fasteners 1001 may be rivets, but those skilled in the art will recognize that tacks, bolts rods, or other types of fasteners could alternatively be used. For this embodiment, moreover, a second fastener depression 301 for the fastener head may advantageously be made in the back surface of the bracket 102 so as to lie flat with the front surface 306 of the adjacent bracket 102 and not hinder rotation. As described above, and illustrated, in FIG. 11b, the placement of the joint 101 is not limited to near the ends of the brackets 102.

Figure 17A:
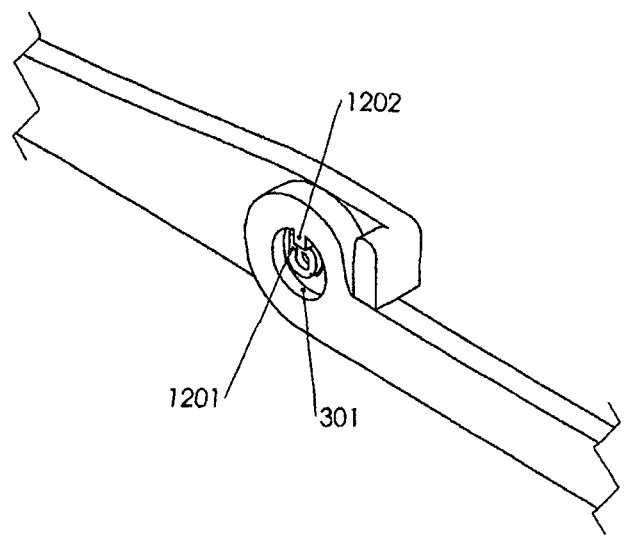
FIG. 17a is a perspective view of the joint of FIG. 2 connecting a pair of brackets comprising a torsion spring fastener in accordance with one embodiment of the present invention.
Figure 17B:
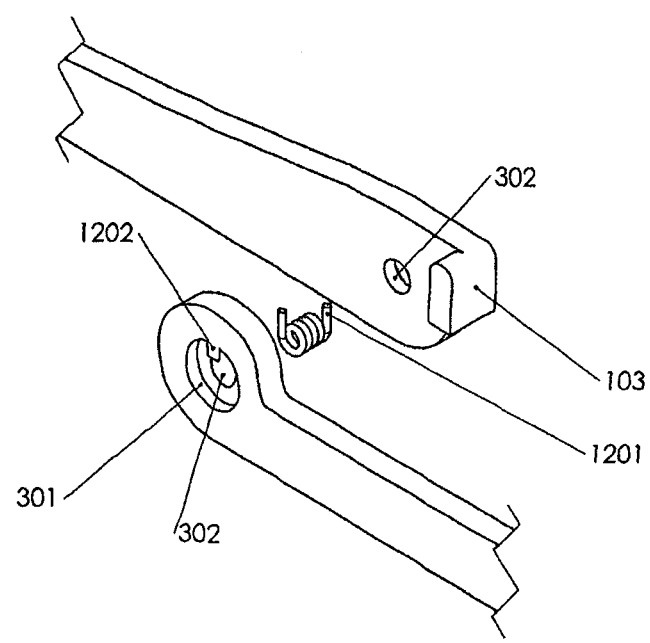
FIG. 17b is an exploded detailed view of the joint of FIG. 17a in accordance with one embodiment of the present invention.

Many variations exist on the fastening mechanism of the brackets, as illustrated in the examples of FIGS. 17a-18b. FIG. 17a illustrates how a helical torsion spring 1201 may also serve as a fastener to pivotably interconnect the brackets 102. As illustrated in FIG. 17b, the torsion spring 1201 is inserted into the fastener hole 302 and abuts against a torsion spring protrusion 1202 within the fastener depression 301 of the bracket 102 so as to induce resistance when the brackets 102 are pivoted into the stowed configuration and also retain its extended configuration. The torque of the torsion spring 1201, moreover, induces the unfolding of the foldable extensions 201 from the stowed to the extended configuration.

Figure 18A:
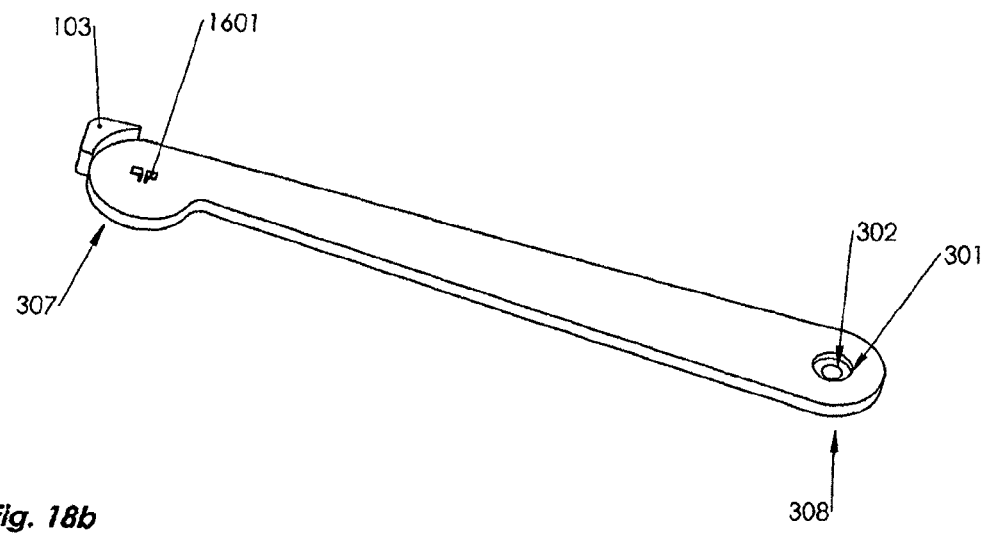
FIG. 18a is a perspective view of a tabbed bracket comprising a tab fastener in accordance with one embodiment of the present invention.
Figure 18B:
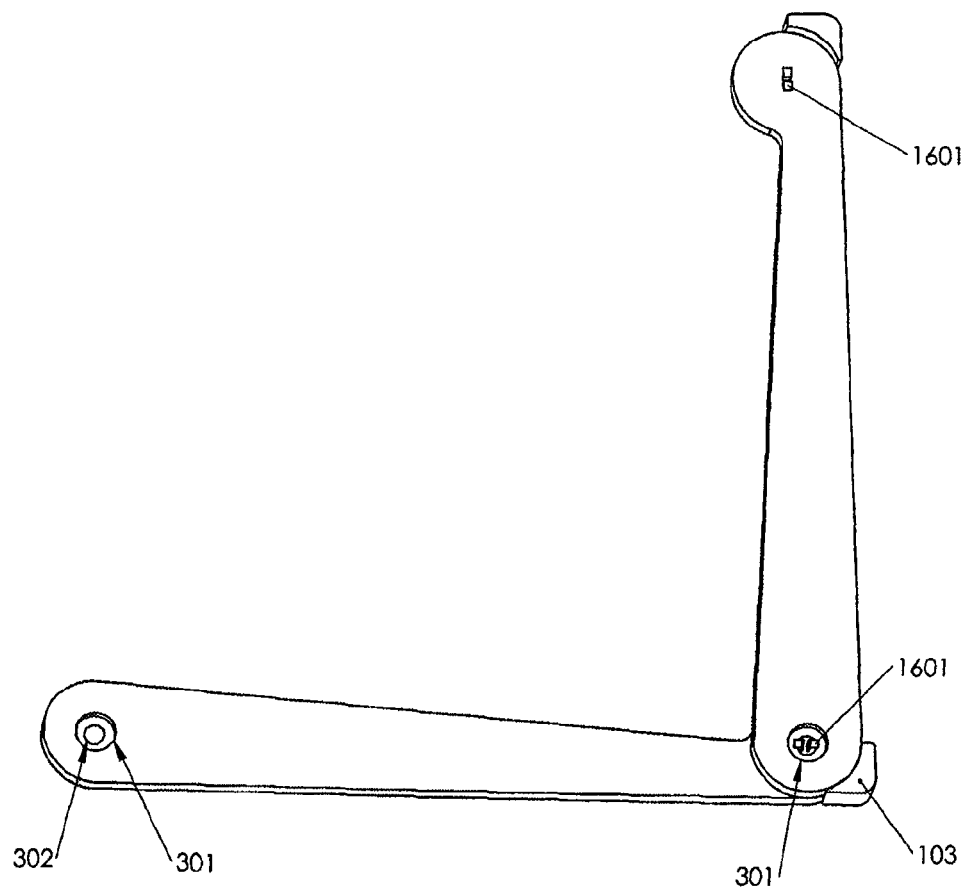
FIG. 18b is a perspective view of the joint of FIG. 2 connecting a pair of the tabbed brackets of FIG. 18a in accordance with one embodiment of the present invention.

In another example connection, as illustrated in FIG. 18a, one or more L-shaped tabs 1601 may be used as fasteners. To avoid hindering pivotability, the tabs 1601 are preferably constructed so that the thickness of the folded edge is less than or equal to the depth of the fastener depression 301 so as to not protrude outside the plane of the front surface 306 of the bracket 102, as shown in FIG. 18b. The tabs may be welded onto or cut directly from the front surface 306 of the bracket 102. While the tab fasteners 1601 illustrated in FIGS. 18a and 18b are rectangular, those of skill in the art will appreciate that the tabs 1601 may alternatively be circular, triangular, or another desired form. Skilled artisans will also appreciate that FIGS. 15a-18b show that the connection mechanism of the joint 101 may vary while maintaining the core functionality, as long as the brackets 102 are pivotably interconnected and that the fasteners do not protrude outside the front surface 306 of the bracket 102 and hinder the pivotability.

Material of the Brackets

The brackets 102 may be made out of any rigid or semi-rigid material, depending on desired application. For example, the brackets 102 in the foldable grill example below may be formed of a generally homogeneous mixture of titanium. This material is safe for cooking, can withstand high temperatures, and is durable and relatively lightweight. Those of skill in the art, however, will recognize that this example may be made of another material such as aluminum, titanium, or an alternative metal, metal alloy, or other material. Other applications may have other considerations regarding materials, such as color, texture, or some other consideration. For the example applications described below in FIGS. 19-28d, the brackets are preferably made from a rigid or semi-rigid material. The material used may also be varied among brackets and among various elements of the joint 101, such as the torsion spring or other types of fasteners.

The following description of example applications further illustrates the usefulness and versatility of the present invention. The example applications are provided as an illustration of how embodiments of the joint 101 may, be employed in various foldable structures. Those of skill in the art will appreciate that there are many other applications of the joint 101, as well as numerous variations of the example applications provided. Accordingly, the following description should not be deemed to limit the scope of the present invention.

Foldable Grill Example Application: Overview

Figure 19:
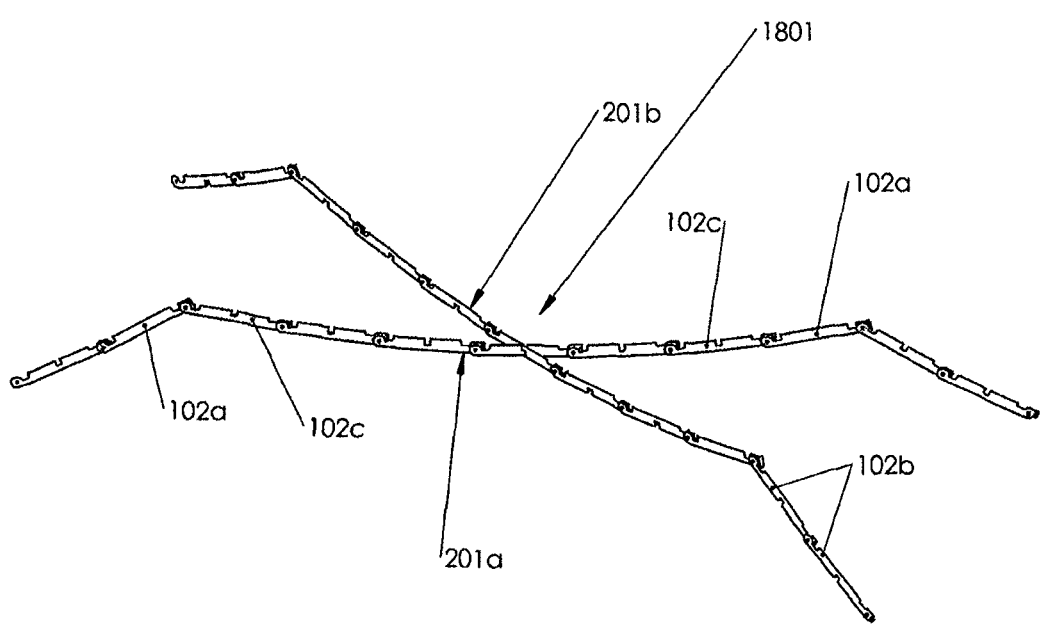
FIG. 19 is a perspective view of a pair of foldable extensions removably interconnected to form a support structure in accordance with one example application of the present invention.

As illustrated in FIGS. 19-21d, one application of the folding joint 101 mechanism may be to a portable cooking apparatus, such as a grill, for the general purpose of heating comestibles using an independent heat source, such as a flame. FIG. 19 illustrates how at least two foldable extensions 201a and 201b may be removably fixed together to form the support structure 1801 for the grill. FIG. 20a illustrates a grate 1901 removably attached to the support structure 1801 of FIG. 19 to form the grill surface, and FIG. 20b illustrates the grill of FIG. 20a in the stowed configuration. These elements are described in greater detail below.

Grill Application: Brackets

Figure 21A:
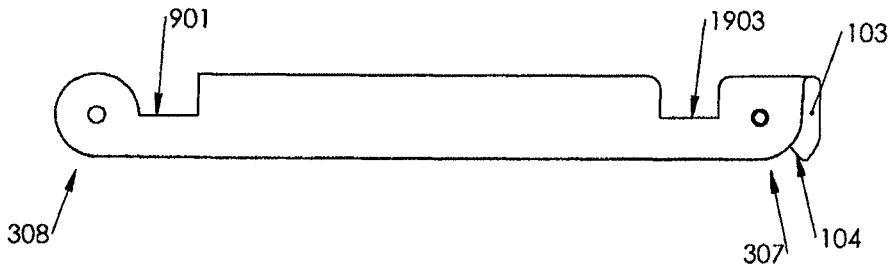
FIG. 21a is a side view of an angled bracket in accordance with one example application of the present invention.
Figure 21B:
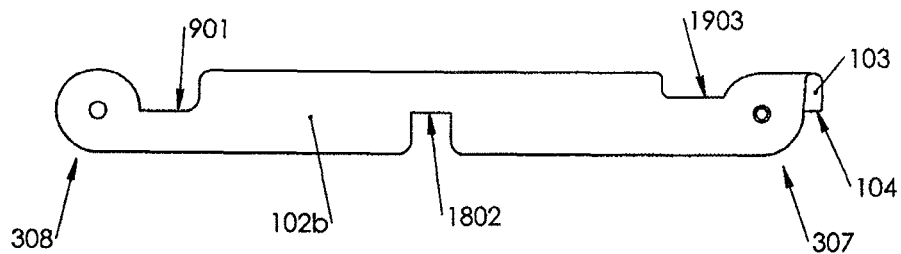
FIG. 21b a side view of a first extension bracket in accordance with one example application of the present invention.
Figure 21C:
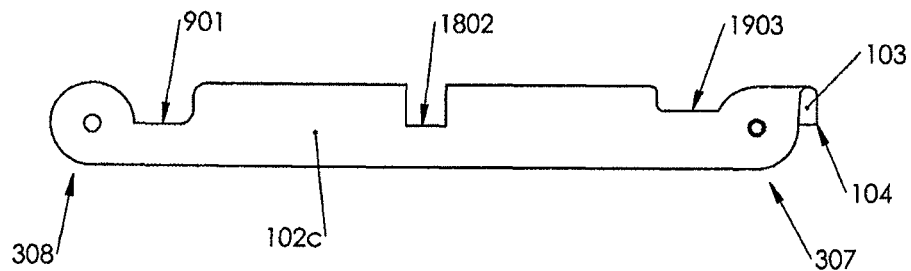
FIG. 21c is a side view of a second extension bracket in accordance with one example application of the present invention.

As illustrated in FIG. 19, the foldable extensions 201a and 201b are comprised of a plurality of substantially different brackets 102a, 102b and 102c. FIGS. 21a-21c illustrate these brackets in more detail. Brackets 102b and 102c, hereinafter referred to as extension brackets, are pivotably connected to the adjacent brackets from the front end 307 to allow for rotation across a stop angle θ in the approximate range of preferably 180°-190°, and most preferably 183°-187° to form the top elongated sections of the support structure 1801. Brackets 102a with an angular cut 104 in the approximate range of preferably 130°-140°, and most preferably 133°-137°, are hereinafter referred to as angled brackets 102a. While this naming convention for the brackets is useful in this example application, those of skill in the art will recognize that in some possible applications, such as in the foldable seating device example in FIGS. 24a-24d described in a later section, the distinction between extension brackets 102b, 102c and angled brackets 102a is not as clear. As seen in FIGS. 21a-21c, the brackets 102a, 102b, moreover, include assembly notches 1802, for joining the foldable extensions 201a and 201b, and brackets 102a, 102b, and 102c include grate notches 1903 for receiving the grate 1901. The function of the notches 1903 is described in greater detail in the following section. Moreover, the dimensions and features of the brackets 102a, 102b, and 102c, as well as the number of brackets used, are highly variable, depending on desired final size and shape of the support structure 1801 they form, as illustrated in FIG. 19. Preferably, the brackets 102a, 102b, and 102c are made from a type of metal or metal alloy so as to provide adequate heat and corrosion resistance, although skilled artisans will recognize that another material with similar advantages may also be used.

Grill Example Application: Support Structure

Figure 21D:
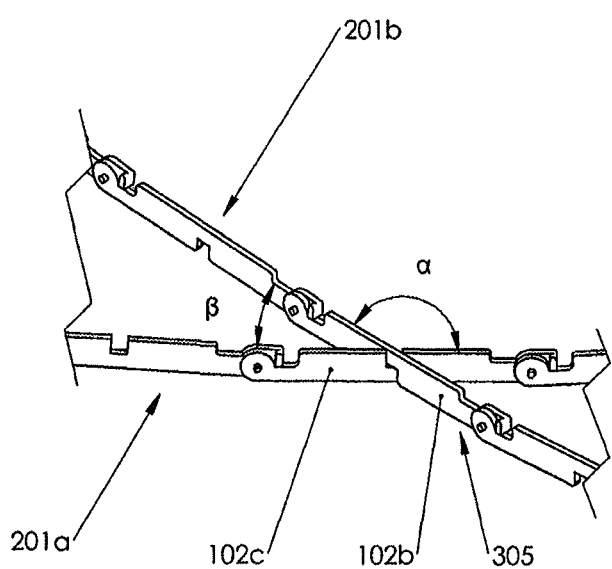
FIG. 21d is a detailed view of the intersection of the foldable extensions in the support structure of FIG. 18 in accordance with one example application of the present invention.
Figure 32:
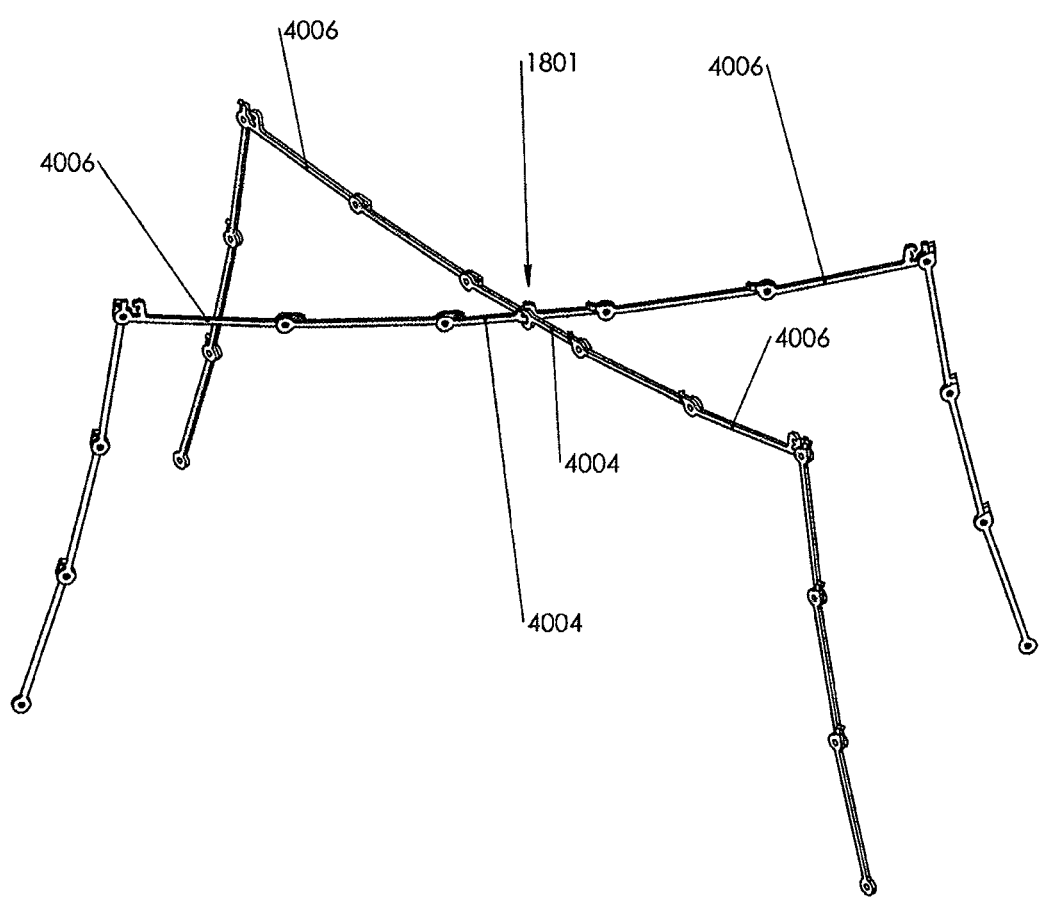
FIG. 32 is a perspective view of a support structure comprised of the brackets shown in FIGS. 29a-31 in accordance with one example application of the present invention.

The foldable extensions 201 are overlapped approximately in the center so as to form a support structure 1801 for the grate 1902, described in the following section. The first foldable extension 201b is mounted on the second 201a by joining the aforementioned complementary assembly notches 1802 on the bottom and top of the respective foldable extensions 201b and 201a, as shown in FIG. 21d. The intersection angles α and β between the foldable extensions 201a and 201b in this example are preferably in the approximate range of 40°-50°, more preferably 43°-47° for intersection angle β, and in the approximate range of 130°-140°, more preferably 133°-137° for angle α. These angles may be varied, however, depending on desired shape and application of the support structure. In this example, the foldable extensions 201a and 201b are not secured in place, as this function is served by the inward tension of the removably attached grate 1901, described below. However, those of skill in the art would recognize that in other variations of the grill, the foldable extensions 201a and 201b could also be securely interlocked in some fashion. The non-straight angular cut of approximately 183°-187° of the extension brackets 102b and 102c, described in the previous section, adds a slight arc to the foldable extensions 201a and 201b, which advantageously reduces disturbances to the support structure 1801 if utensils used to move comestibles on the grate 1901 penetrate the grate surface. Moreover, those skilled in the art will appreciate that other variations may exist, both regarding the method of joining the foldable extensions 201a and 201b, and the number of foldable extensions 201a and 201b, used, depending on the desired variation and application. FIG. 32 illustrates a variation of the grill support structure comprised of the more easily manufactured brackets of FIGS. 29a-31.

Grill Example Application: Grate

Figure 20A:
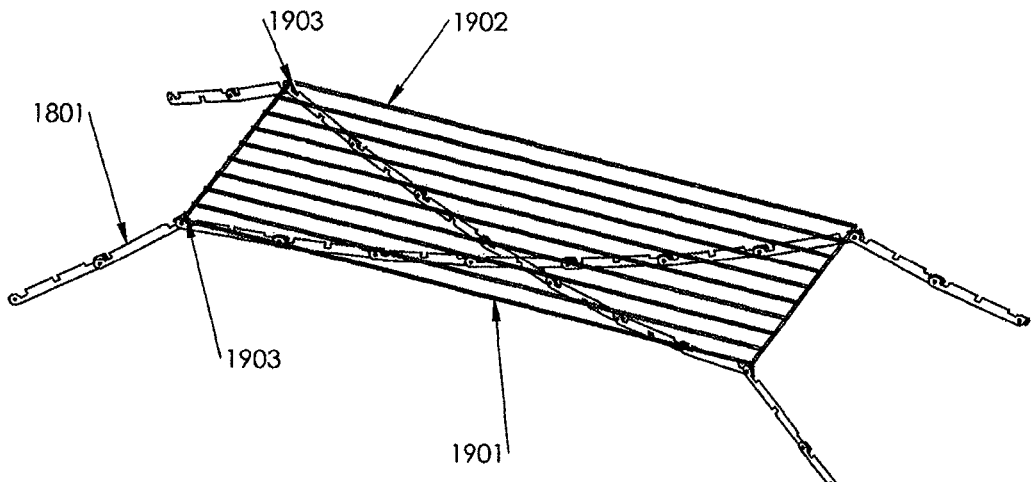
FIG. 20a is a perspective view of the support structure of FIG. 19 with a grate removably attached to form a foldable grill in accordance with one example application of the present invention.
Figure 20B:
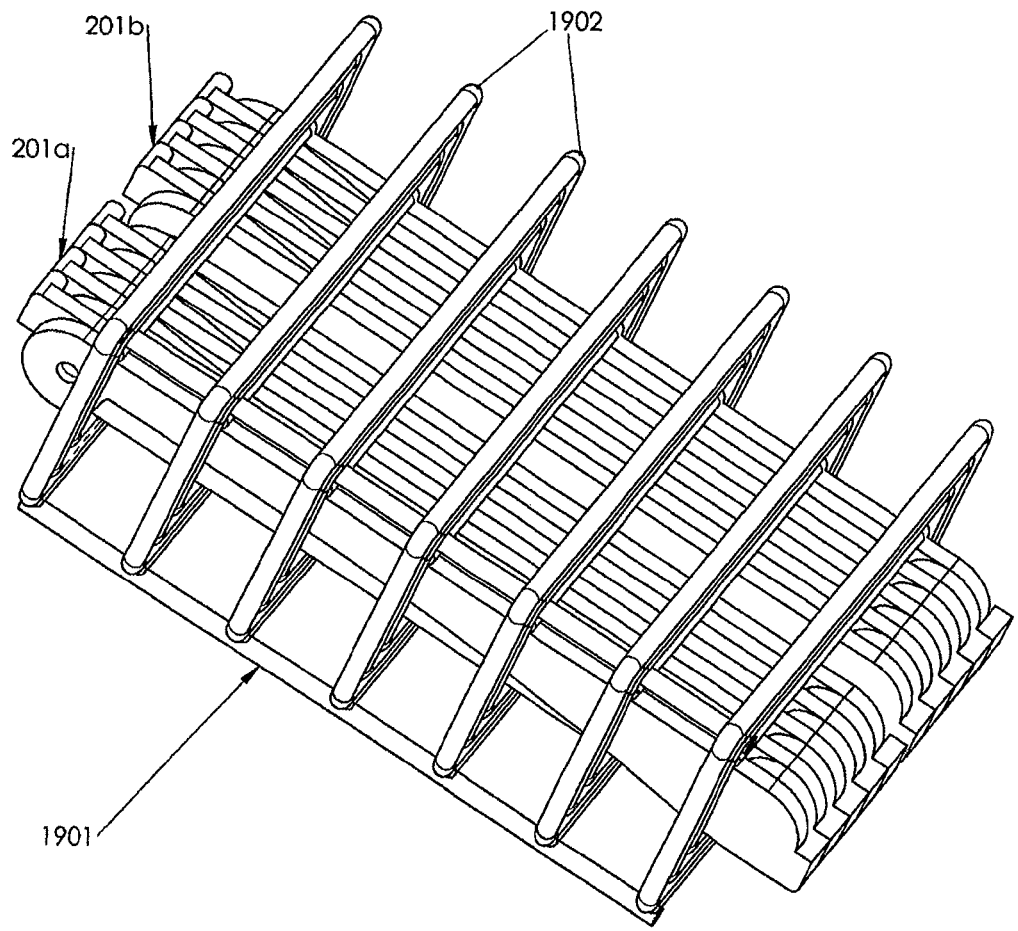
FIG. 20b is a perspective view of the foldable grill of FIG. 20a in the stowed configuration in accordance with one example application of the present invention.

As mentioned above, a grate 1901 is removably attached to the support structure 1801 through grate notches 1903 on the top surface 304 of the angular brackets 102a. The tension of the centrally directed force from the grate 1901 serves to secure the foldable extensions 201a and 201b in respect to each other. The grate 1901 is preferably constructed from flexible wire mesh with longitudinal grate bars 1902 in this example, as illustrated in FIG. 20a, but can alternatively be constructed from rigid bars, a wire mesh with an alternative pattern, such as hexagonal, or in some other fashion. Moreover, a solid sheet may also be used in place of a grate, although this arrangement may compromise the advantageous compactability of the grate 1901 and thus the entire grill. FIG. 20b illustrates the grill in a stowed configuration, with the wire mesh grate 1901 wrapped around the frame elements 201a and 201b.

Foldable Table Example Application

Figure 22A:
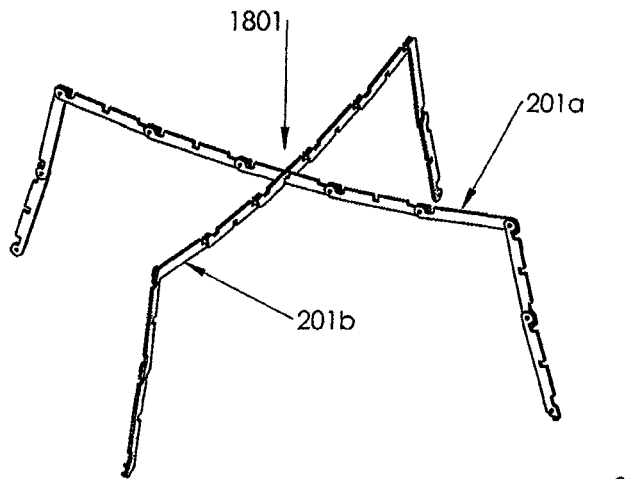
FIG. 22a is a perspective view of a table support structure in accordance with one example application of the present invention.
Figure 22B:
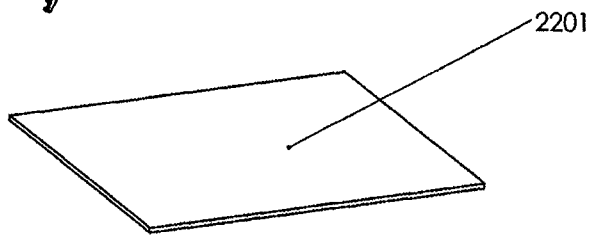
FIG. 22b is an exploded perspective view of a foldable table in accordance with one example application of the present invention.
Figure 22C:
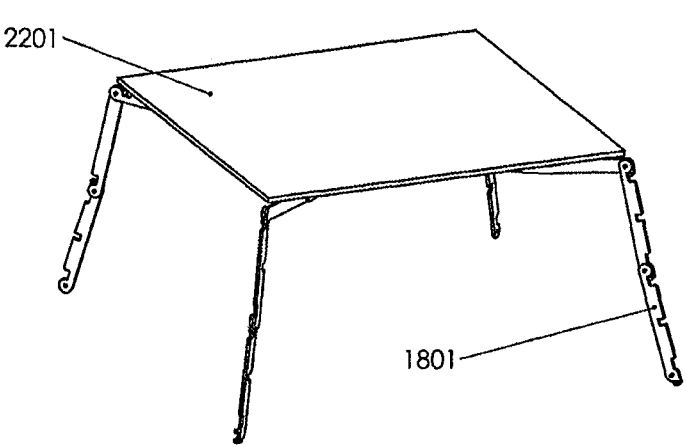
FIG. 22c is a perspective view of the foldable table in FIG. 22b in accordance with one example application of the present invention.

FIGS. 22a-22c illustrate another application of the foldable joint 101 mechanism, which is a table in this example application but a similar assembly may alternatively be applied to other types of furniture, such as sofas, nightstands, seating devices, as described below, and many others. The table example includes at least two foldable extensions 201a and 201b that intersect in approximately the center to form a support structure 1801 to which a table top 2201 is removably attached. Those of skill in the art will recognize that the support structure 1801 of the table is constructed similarly to that of the grill application described above. Similarly to the support structure 1801 of the grill, the foldable extensions 201a and 201b of the table interconnect through complementary assembly notches 1802, one on the bottom surface 305 of the first frame element 201b, and another on the top surface 304 of the second frame element. The foldable extensions of the support structure 1801 are held in place by the centrally-directed force of a table top 2201 removably attached by inserting attachment loops into receiving notches 1903 in the support structure 1801, although the table top 2201 may be attached in some other fashion. The brackets 102a, 102b, and 102c of the support structure 1801 are preferably constructed out of a rigid or semi-rigid material, and the table top 2201 is preferably constructed out of a flexible material, such as canvas, although alternative material may be used in both the brackets and the table top. Those of skill in the art would further recognize that there are many other variations of a table that includes the joint 101 of the present invention, such as alternative numbers and arrangements of the foldable extensions, and alternative table top attachment methods and designs.

Foldable Stool Example Application

Figure 23A:
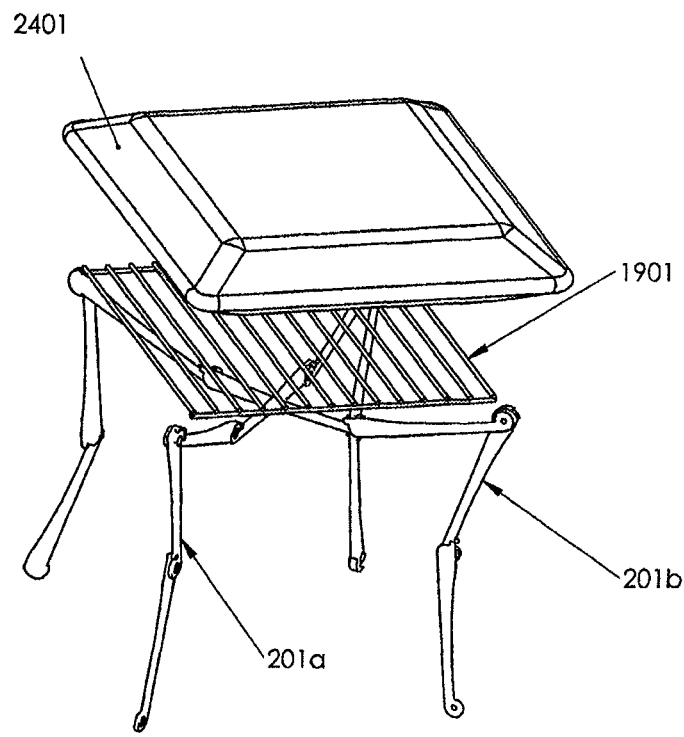
FIG. 23a is an exploded, perspective view of a foldable stool in accordance with one example application of the present invention.
Figure 23B:
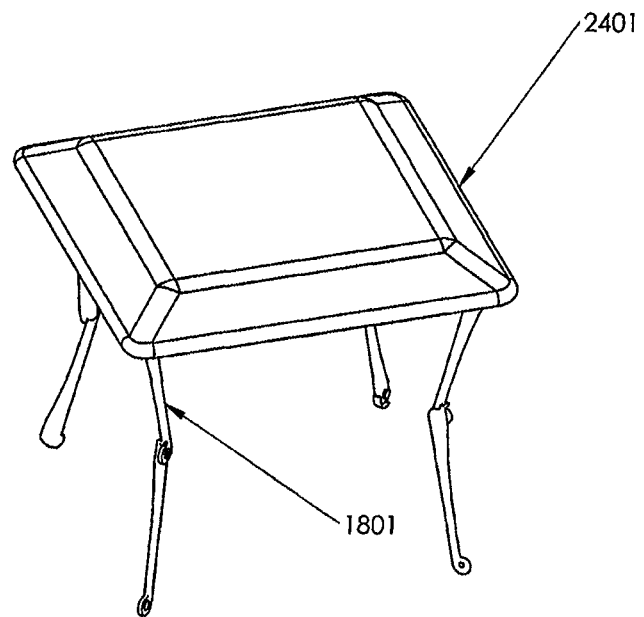
FIG. 23b is a perspective view of the foldable stool in accordance with one example application of the present invention.

FIGS. 23a-23b illustrate a foldable stool with a support structure 1801 similar to that of the table and grill example applications mentioned above. Similarly to the table and grill applications, the stool includes at least two foldable extensions 201a and 201b that intersect approximately in the center to form a support structure 1801 to which a grate 1901 and a seating surface 2401 are removably attached. Also similarly to the above examples, the foldable extensions 201a and 201b interconnect through complementary assembly notches 1802, one on the bottom surface 305 of the first frame element 201b, and another on the top surface 304 of the second frame element 201a. As the table example above, the stool includes a plurality of extension 102b, 102c and angled brackets 102a that form corners in the foldable extensions 201a and 201b to yield substantially parallel stool legs. The foldable extensions 201a and 201b of the support structure 1801, similarly to the grill example, are held in place by the centrally-directed force of a support grate 1901, removably attached to the support structure 1801 through receiving notches 1903 in the front ends 307 of the angled brackets 102a, and a seating surface 2401 is removably mounted on top of the support grate 1901. The brackets 102a, 102b, 102c are preferably constructed out of a rigid or, semi-rigid material, and the grate 1901 is preferably constructed out of a flexible mesh to advantageously facilitate compactability although another material may also be used. The stool surface is preferably formed out of a substantially soft material, such as a feather-filled cushion, so as to provide comfort for users, although the material may vary, depending on the desired comfort level. The stool of FIG. 23b may be employed as a seating device, a foot rest, or a support structure of some other sort. Those of skill in the art would appreciate that other alternative embodiments of the stool may exist, such as ones comprising alternative quantities and arrangements of the foldable extensions 201a and 201b, alternative seating surfaces 2401, support grates 1901, and other features.

Foldable Seating Device Example Application

Figure 24A:
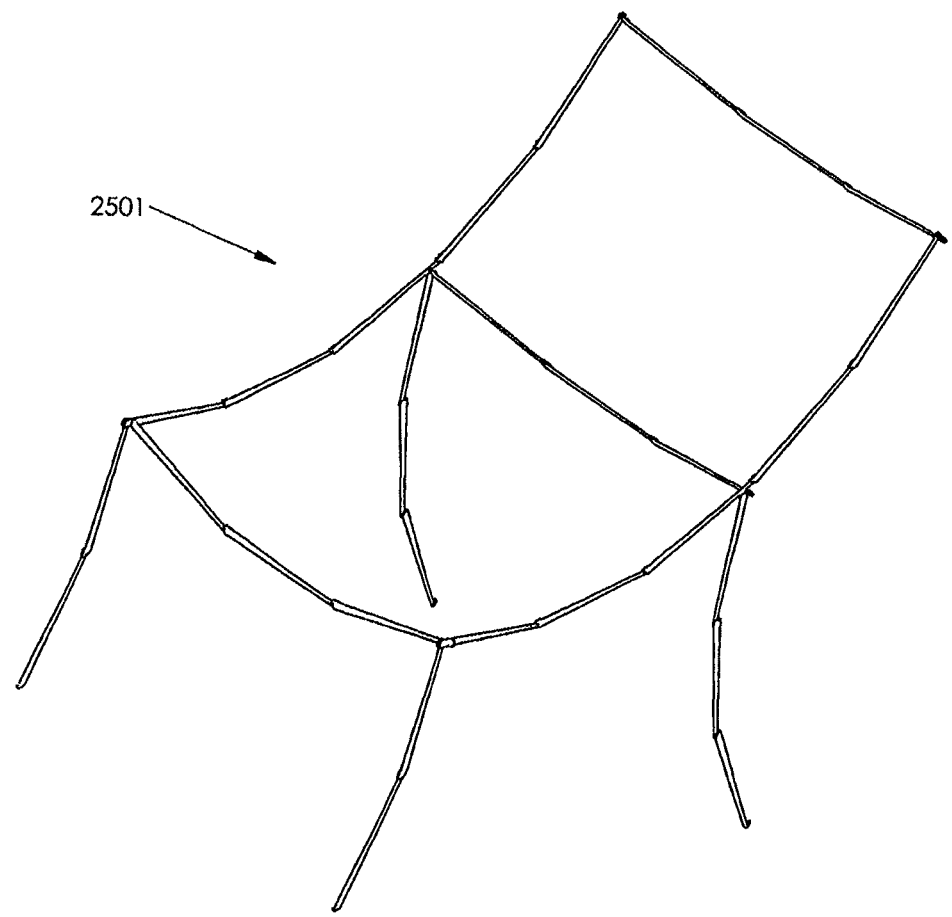
FIG. 24a is a perspective view of a support structure for a foldable seating device in accordance with one example application of the present invention.
Figure 24B:
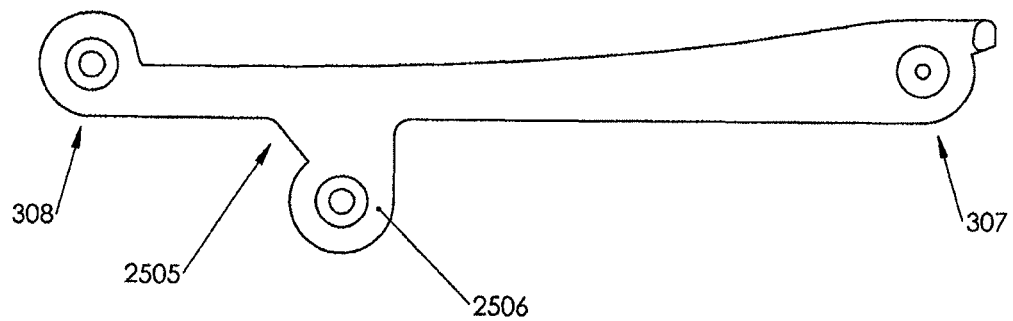
FIG. 24b is a side view of a multi-connection bracket in accordance with one embodiment of the present invention.
Figure 24C:
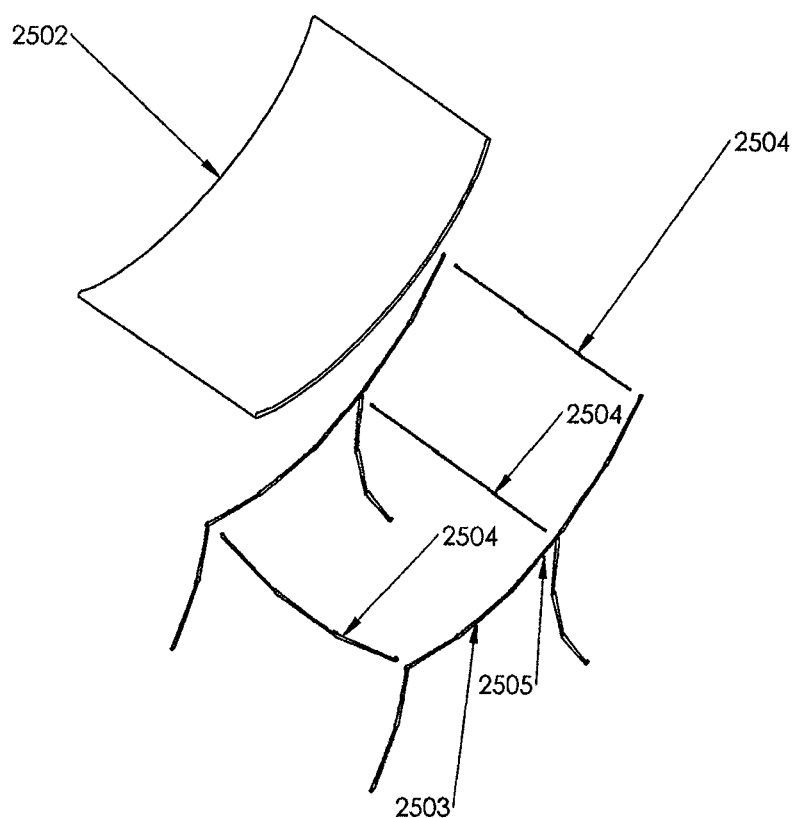
FIG. 24c is an exploded perspective view of a foldable seating device in accordance with one example application of the present invention.
Figure 24D:
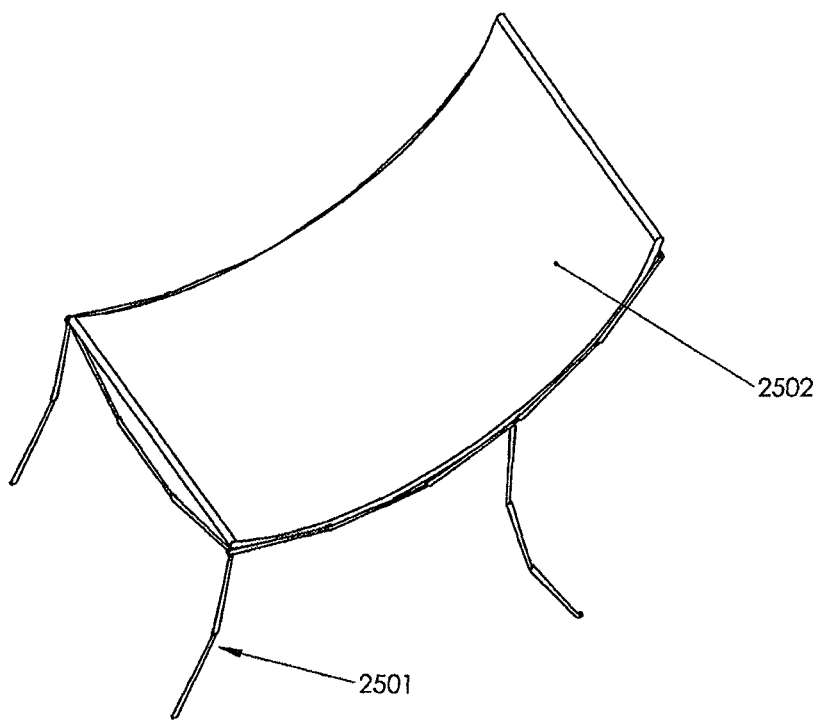
FIG. 24d is a perspective view of the foldable seating device of FIG. 24c in accordance with one example application of the present invention.

FIG. 24a-24d illustrate a foldable seating device that comprises a support structure 2501, illustrated in FIG. 24a, that includes a plurality of frame elements 2503 that comprise foldable extensions. FIG. 24c illustrates an exploded view of the foldable seating device, showing that each frame element 2503 is comprised of at least two foldable extensions interconnected by a multiple connection bracket 2505, shown in FIG. 24b. This multiple connection bracket 2503 may have multiple fastener holes 302 and thus allow more than 2 foldable extensions 201 to be pivotably interconnected at one bracket 2505. At least two support members 2504 connect in a substantially perpendicular fashion to the frame elements 2503, forming the support structure 2501. A seating surface 2502 is then removably mounted on top of the support structure 2501 into receiving notches 1903 on the frame elements 2503. The seating surface 2502 may be a cushion or a semi-rigid canvas-like surface, similar to that of the stool described in the previous section.

Interchangeable Foldable Boat and Shelter Example Application

Figure 25A:
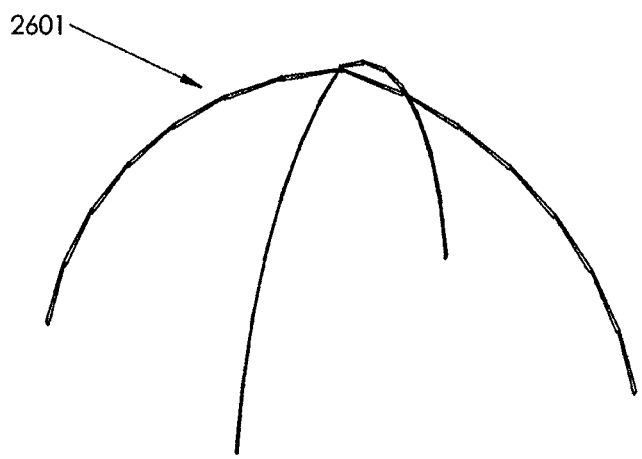
FIG. 25a is a perspective view of a shelter support structure in accordance with one example application of the present invention.
Figure 25B:
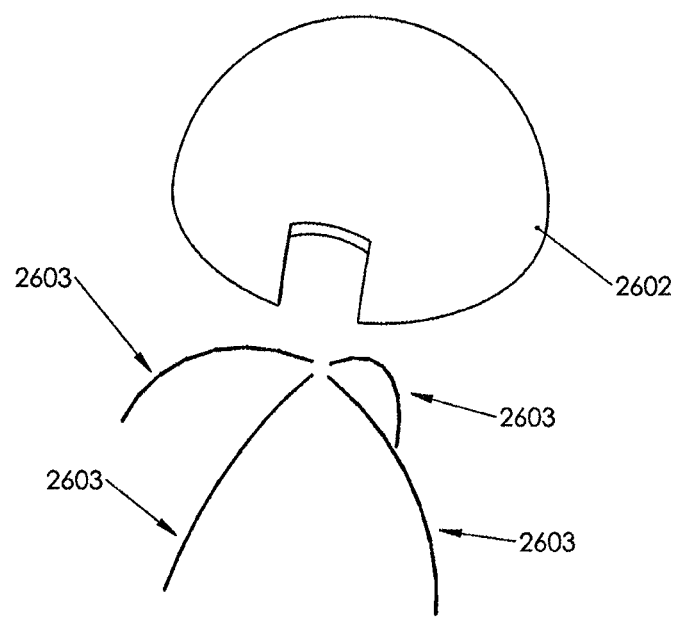
FIG. 25b is an exploded perspective view of a foldable shelter in accordance with one example application of the present invention.
Figure 25C:
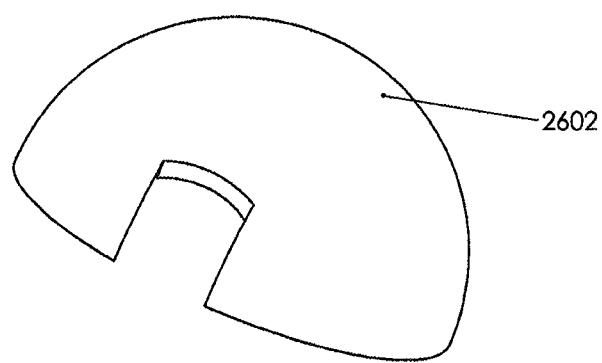
FIG. 25c is a perspective view of the foldable shelter in FIG. 25b in accordance with one example application of the present invention.
Figure 25D:
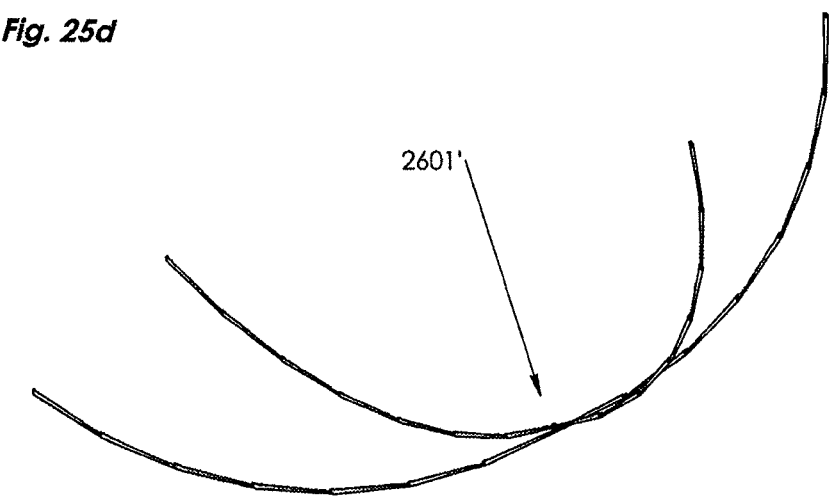
FIG. 25d is perspective view of a boat support structure in accordance with one example application of the present invention.
Figure 25E:
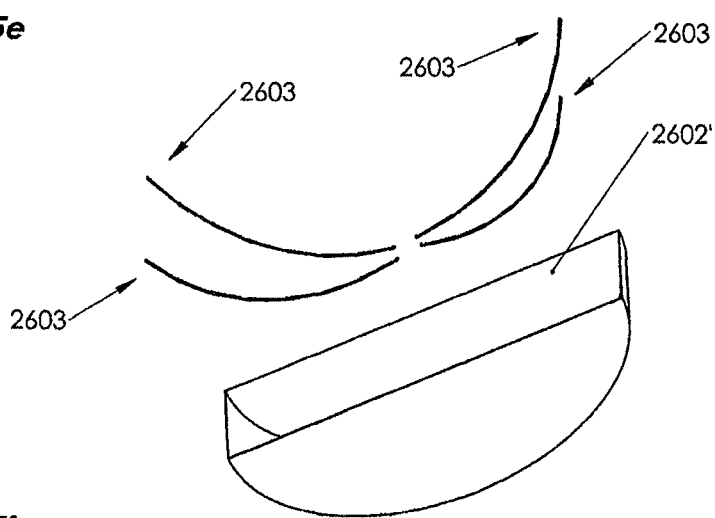
FIG. 25e is an exploded perspective view of a foldable boat in accordance with one example application of the present invention.
Figure 25F:
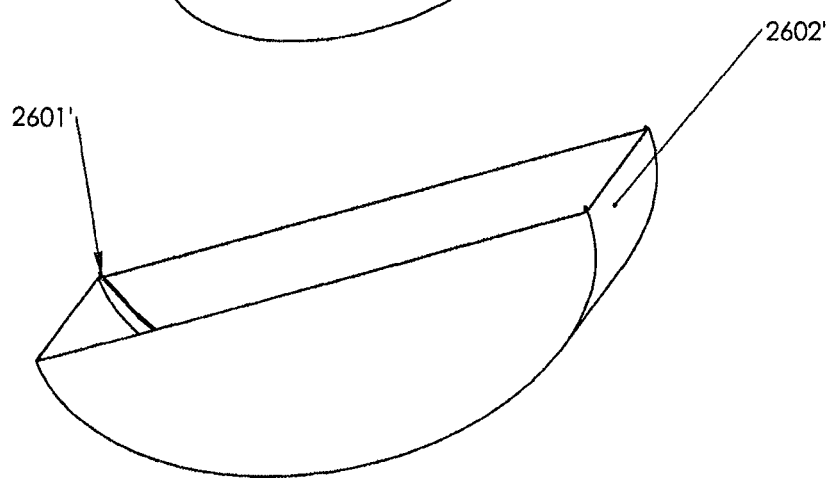
FIG. 25f is a perspective view of the foldable boat of FIG. 25e in accordance with one example application of the present invention.

FIGS. 25a-25f illustrate an assembly with at least two configurations, a shelter configuration in FIG. 25c and a boat configuration in FIG. 25f. The shelter configuration comprises a plurality of substantially arched, foldable extensions 2603 interconnected at a junction point so as to form a shelter support structure 2601. To interconnect the foldable extensions, a fastener such as a carabiner or some other sturdy device may be inserted through each fastener hole 302 on the topmost bracket 102 of each foldable extension 2603 and securely locked to maintain the shape of the support structure 2601. A shelter cover 2602 is then removably attached to the support structure 2601 through receiving notches in the foldable extensions 2601, similarly to the grill application, so as to form a shelter, as illustrated in FIG. 25c. The same foldable extensions 2603 are reconfigurable into a boat by changing the intersection angle of the foldable extensions 2602, thus forming a boat frame 2601' in FIG. 25d. the shelter cover 2602 is then reconfigured to fit around the boat frame 2601' to form a boat skin 2602', illustrated in FIGS. 25e-25f. The above description is offered to illustrate the versatility and reconfigurability of the foldable extensions 2603. However, those of skill in the art will recognize that if desired, both the shelter and boat may be formed out of foldable extensions 201 specialized for the respective application and thus not interchangeable.

Foldable Box Spring Example Application

Figure 26A:
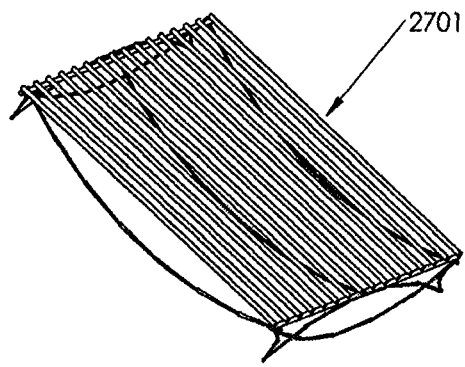
FIG. 26a is a perspective view of a box spring frame in accordance with one example application of the present invention.
Figure 26B:
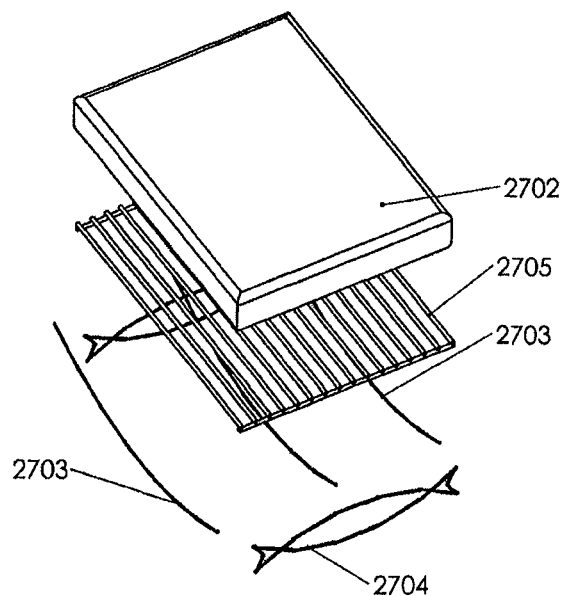
FIG. 26b is an exploded perspective view of a foldable box spring in accordance with one example application of the present invention.
Figure 26C:
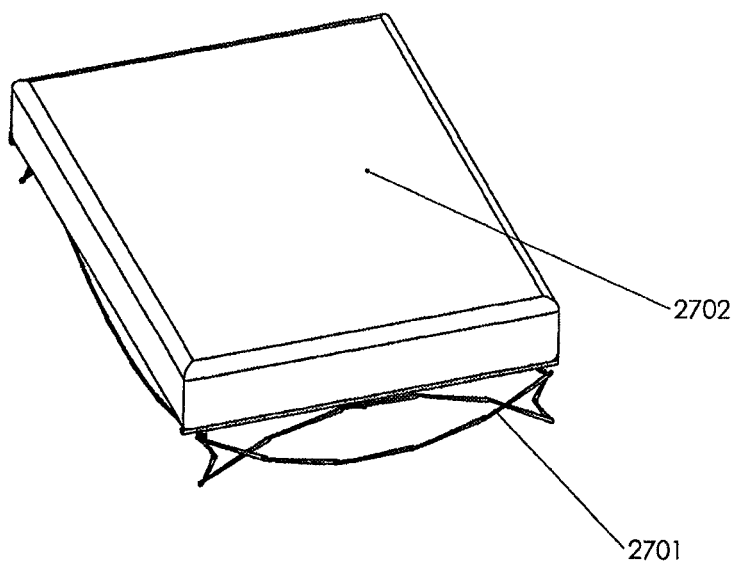
FIG. 26c is a perspective view of the foldable box spring of FIG. 26b in accordance with one example application of the present invention.

FIG. 26a-26c illustrate a foldable box spring that comprises a plurality of frame elements 2703 joined together by reinforcement wires 2704 forming a support structure 2701 for the support grate 2705. The box spring 2702 is then removably attached to receiving notches 1903 on angled brackets 102a within the frame elements 2703, similarly to the grill grate attachment described in a previous section.

Scaffolding Example Application

Figure 27A:
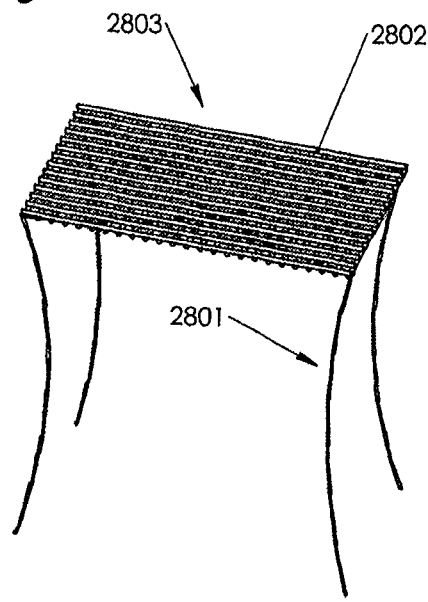
FIG. 27a is an exploded perspective view of a foldable scaffolding unit in accordance with one example application of the present invention.
Figure 27B:
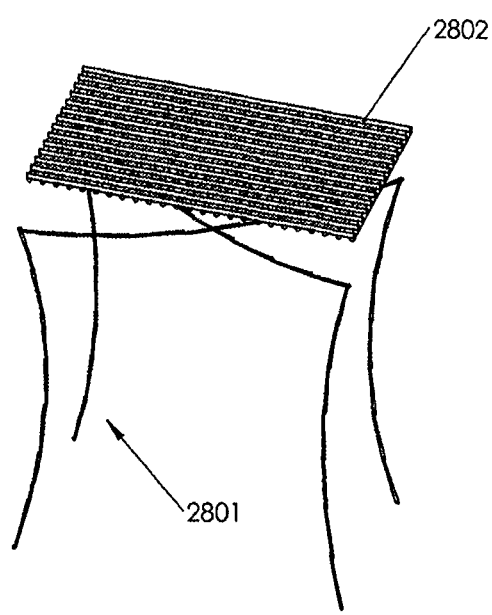
FIG. 27b is a perspective view of the foldable scaffolding unit of FIG. 27a in accordance with one example application of the present invention.
Figure 27C:
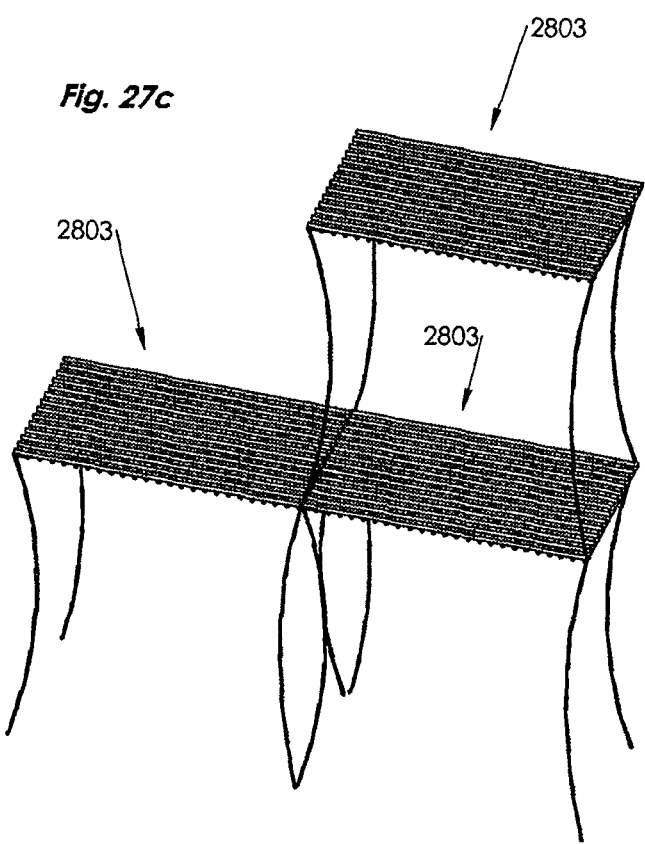
FIG. 27c is a perspective view of a stacked plurality of the foldable scaffolding units of FIG. 27a in accordance with one example application of the present invention.

FIG. 27a-27c illustrate a scaffolding assembly that comprises a plurality of scaffolding units 2803, illustrated in FIG. 27a, adjacently aligned and stacked, as illustrated in FIG. 27c. Similarly to the grill, table, and stool applications described above, each scaffolding unit includes at least two foldable extensions 201a and 201b that intersect in approximately the center to form a support structure 2801 to which a surface grate 2802 is removably attached. The scaffolding unit 2803 includes a plurality of extension 102b and 102c and angled brackets 102a that construct corners in the foldable extensions 201a and 201b to form substantially parallel support legs. The foldable extensions of the support structure 2801 are held in place by the centrally-directed force of a surface grate 2802 removably attached through receiving notches 1903 in the support structure 2801, as illustrated in FIG. 27b. As illustrated in FIG. 27c, the scaffolding units 2803 may then be mounted on top of each other to form a scaffolding assembly. The brackets 102a, 102b, and 102c of the support structure 2801, as well as the grate surface 2802, are preferably constructed out of a rigid or semi-rigid material so as to support sufficient weight for multiple scaffolding units 2803 stacked on top of each other, although an alternative material may be used as well.

Shovel Handle Example Application

Figure 28A:
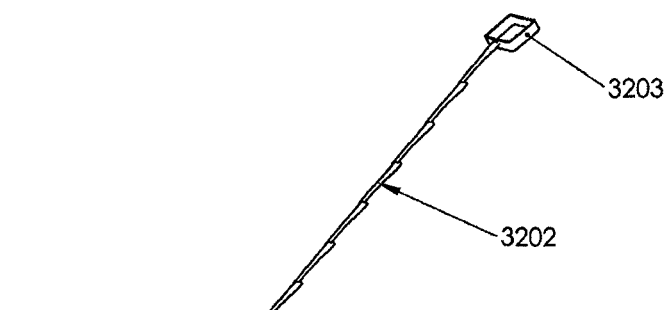
FIG. 28a is a perspective view of a foldable shovel in accordance with one example application of the present invention.
Figure 28B:
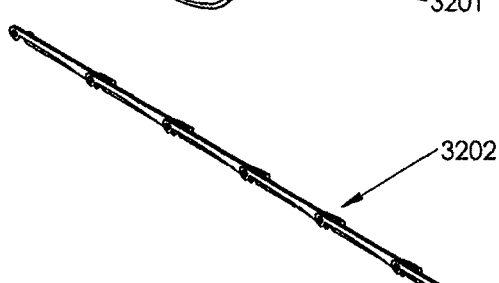
FIG. 28b is a perspective view of the handle shaft of the foldable shovel of FIG. 28a comprising a pair of oppositely facing foldable extensions, in accordance with one application of the present invention.
Figure 28C:
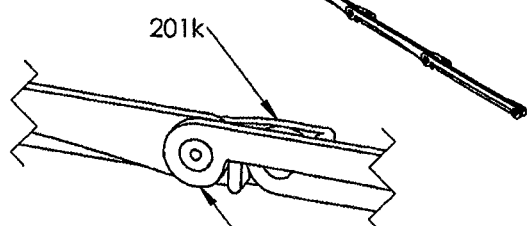
FIG. 28c is a detailed perspective view of the handle shaft of FIG. 28b in accordance with one example application of the present invention.
Figure 28D:
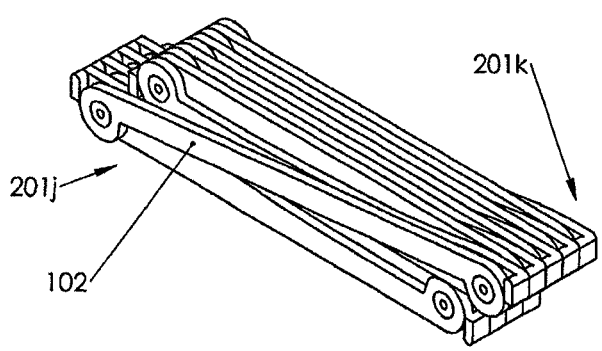
FIG. 28d is a perspective view of the shovel handle of FIG. 28b in the stowed configuration in accordance with one example application of the present invention.

FIG. 28a illustrates a foldable shovel that comprises at least one foldable extension to form the handle shaft 3202, removably attached to the shovel blade 3201 at one end and a handle grip 3203 at the other end. While the handle shaft 3202 may be formed out of one foldable extension 201, FIGS. 28b-28c illustrate how at least two foldable extensions 201j and 201k may be connected such that they fold in opposite directions and thus maintain one another in the extended configuration. FIG. 28d is a detailed view of how foldable extensions 201j and 201k may be interconnected and folded into a compact stowed configuration. The handle grip 3203 and shovel blade 3201 are detachable for shipping, storage, and user transportation. This doubling configuration may be employed in other types of handles or devices with elongated sections, such as fishing rods, ski poles, oars, swords, javelins, rackets, bats, basketball hoops, shelter frames poles, walkers, canes, crutches, rakes, brooms, mops, easel displays, and music stands, among many others.

DISCLAIMER

The present invention may, of course, be carried out in other specific ways than those herein set forth without departing from the essential characteristics of the invention. The present embodiments and example applications are, therefore, to be considered in all respects as illustrative and not restrictive, and all changes coming within the meaning and equivalency range of the appended claims are intended to be embraced therein.

I claim:

1. A grill and support structure, comprising:
   first and second foldable support members each made up of a plurality of pivotably linked brackets each having a front end and a back end, said front end having a normally extending stop protrusion projecting from a side of said respective bracket and having a stop surface, said front end defining a front pivot point, said back end having an arcuate outer periphery and defining a back pivot point and at least a portion of a first edge surface, said first edge surface including an assembly notch thereon between said front and back end, said front end being joined to said back end of an adjacent bracket at said pivot points such that said brackets pivot relative to each other between a stowed position in which all of said brackets are adjacent to, each other in a parallel, aligned orientation, an extended position in which some of said brackets extend linearly relative to each other and said stop surface of one bracket engages said assembly notch of said first edge surface of an adjacent bracket proximate said back end thereof, and an angled position in which other of said brackets extend at an obtuse angle with respect to each other and said stop surface of one bracket engages said assembly notch of said first edge surface of an adjacent bracket proximate said back end thereof;
   said first foldable support member being configured such that some of brackets in a middle section thereof being in the extended position and two of the brackets proximate opposed end sections of the first foldable support member are in the angled position;
   said second foldable support member being configured such that some of brackets in a middle section thereof being in the extended position and two of the brackets proximate opposed end sections of the second foldable support member are in the angled position;
   said first and second support members intersecting one another in their respective middle section at complementary assembly notches to form a support structure with opposed terminal ends of each first and second support member engaging a support surface to position the brackets in the middle section above the support surface;
   a grate for use as a grill positioned on said first and second support members, at least one of said brackets further including corresponding grate notches for accommodating and supporting said grate.

2. The grill and support structure of claim 1 wherein two of said brackets in each of said middle sections of said first and second support members include said grate notches, said grate being secured in or accommodated by said grate notches.

3. The grill and support structure of claim 2 wherein each of said end sections of said support members extends obtusely from said middle sections of said support members to support said middle sections and said grate.

4. The grill and support structure of claim 2 wherein said intersecting support members define intersecting angles, said intersecting angles including a first angle in the range of 40-50°, and a second angle in the range of 130-140°.

5. The grill and support structure of claim 1 further including a fastener rotatably joining said pivot points.

6. The grill and support structure of claim 1 wherein said front end and said back end of each bracket have the same height.

7. The grill and support structure of claim 1 wherein said grate comprises a flexible mesh material.

8. A support structure, comprising:
   first and second foldable support members each made up of a plurality of pivotably linked brackets each having a front end and a back end, said front end having an extending stop protrusion projecting from said front end and having a stop surface, said front end defining a front pivot point, said back end having an arcuate outer periphery and defining a back pivot point and at least a portion of a first edge surface, said first edge surface including an assembly notch thereon between said front and back end, said front end being joined to said back end of an adjacent bracket at said pivot points such that said brackets pivot relative to each other between a stowed position in which all of said brackets are adjacent to each other in a parallel, aligned orientation, an extended position in which some of said brackets extend linearly relative to each other and said stop surface of one bracket engages said assembly notch of said first edge surface of an adjacent bracket proximate said back end thereof, and an angled position in which other of said brackets extend at an obtuse angle with respect to each other and said stop surface of one bracket engages said assembly notch of said first edge surface of an adjacent bracket proximate said back end thereof;
   said first foldable support member being configured such that some of brackets in a middle section thereof being in the extended position and two of the brackets proximate opposed end sections of the first foldable support member are in the angled position;
   said second foldable support member being configured such that some of brackets in a middle section thereof being in the extended position and two of the brackets proximate opposed end sections of the second foldable support member are in the angled position;

said first and second support members intersecting one another in their respective middle section at complementary assembly notches to form a support structure with opposed terminal ends of each first and second support member engaging a support surface to position the brackets in the middle section above the support surface;

a generally flat support surface positioned on said first and second support members, at least one of said brackets further including corresponding grate notches for accommodating and supporting said support surface.

9. The support structure of claim 8 wherein the generally flat support surface is grate for being used as a grill.

10. The support structure of claim 9 wherein two of said brackets in each of said middle sections of said first and second support members include said grate notches, said grate being secured in or accommodated by said grate notches.

11. The support structure of claim 9 wherein each of said end sections of said support members extends obtusely from said middle sections of said support members to support said middle sections and said grate.

12. The support structure of claim 8 wherein said intersecting support members define intersecting angles, said intersecting angles including a first angle in the range of 40-50°, and a second angle in the range of 130-140°.

13. The support structure of claim 8 further including a fastener rotatably joining said pivot points.

14. The support structure of claim 8 wherein said front end and said back end of each bracket have the same height.

15. The support structure of claim 9 wherein said grate comprises a flexible mesh material.

* * * * *